US008295760B2

(12) United States Patent
Jeong et al.

(10) Patent No.: US 8,295,760 B2
(45) Date of Patent: Oct. 23, 2012

(54) MOBILE TERMINAL AND METHOD OF CONTROLLING BROADCAST THEREIN

(75) Inventors: Yong Chan Jeong, Suwon-Si (KR); Jang Hyung Cho, Seoul (KR); Seung Woo Seo, Seoul (KR); Young Seok Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 12/539,319

(22) Filed: Aug. 11, 2009

(65) Prior Publication Data

US 2010/0136899 A1 Jun. 3, 2010

(30) Foreign Application Priority Data

Nov. 28, 2008 (KR) ........................ 10-2008-0119513

(51) Int. Cl.

| | |
|---|---|
| ***H04H 20/71*** | (2008.01) |
| ***H04H 60/09*** | (2008.01) |
| ***H04B 7/00*** | (2006.01) |
| ***H04B 1/16*** | (2006.01) |

(52) U.S. Cl. ..................... 455/3.01; 455/3.04; 455/3.06; 455/66.1; 455/344

(58) Field of Classification Search ................. 455/3.01, 455/3.06, 66.1, 899, 406
See application file for complete search history.

(56) References Cited

U.S. PATENT DOCUMENTS

| | | | | |
|---|---|---|---|---|
| 6,975,836 | B2 * | 12/2005 | Tashiro et al. | 455/3.01 |
| 7,907,953 | B2 * | 3/2011 | Moreillon | 455/453 |
| 2006/0271996 | A1 * | 11/2006 | Sato | 725/135 |
| 2007/0049037 | A1 * | 3/2007 | Graettinger et al. | 438/700 |
| 2009/0088068 | A1 * | 4/2009 | Ferrazzini et al. | 455/3.06 |

* cited by examiner

*Primary Examiner* — Tilahun B Gesesse
(74) *Attorney, Agent, or Firm* — Birch, Stewart, Kolasch & Birch, LLP

(57) ABSTRACT

A mobile terminal and method of controlling a broadcast therein are disclosed, by which a currently-output broadcast content can be continued to be output despite expiration of a validity term of a broadcast viewing authority. The method includes acquiring a first broadcast viewing authority, receiving and outputting a first broadcast content if the first broadcast viewing authority is acquired, determining whether a validity term of the acquired first broadcast viewing authority expires within a broadcast time of the output first broadcast content, and if the validity term expires within the broadcast time, displaying an image for a purchase of the first broadcast content.

20 Claims, 25 Drawing Sheets

Broadcast organization table on October 20, 2000

| Time \ CH | CH1 | ··· | CH5 |
|---|---|---|---|
| 6:00~ 7:00 | 1-1 Program | | 5-5 Program |
| 7:00~ 8:00 | 1-2 Program | | 5-2 Program |
| ⋮ | ⋮ | ⋰ | ⋮ |
| 12:00~ 13:00 | 1-3 Program | Viewing reservation ☑ Image reservation ☐ | 5-3 Program |
| ⋮ | ⋮ | ⋰ | ⋮ |

MOBILE TERMINAL AND METHOD OF CONTROLLING BROADCAST THEREIN

Pursuant to 35 U.S.C. §119(a), this application claims the benefit of an earlier filing date and right of priority to Korean Patent Application No. 10-2008-0119513, filed in the Korean Intellectual Property Office on Nov. 28, 2008, the contents of which are hereby incorporated by reference herein in their entirety.

BACKGROUND OF THE INVENTION

1. Field of the Invention

The one or more embodiments of the present invention relate to a mobile terminal, and more particularly, to a mobile terminal and method of controlling a broadcast therein. Although the one or more embodiments of the present invention are suitable for a wide scope of applications, they are particularly suitable for a mobile terminal having a broadcast receiving function.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example. To support an increase of the terminal functions, it may be able to consider the improvement of structural part and/or software part of the terminal.

Generally, a broadcast receiving terminal acquires a broadcast viewing authority having a term of validity and a terminal user is then able to freely view broadcast contents provided on a prescribed broadcast channel during the term of validity. If a term of validity set for a previously acquired broadcast viewing authority expires, a broadcast receiving terminal displays a broadcast product purchase window. If a terminal user makes a request for a broadcast product purchase, the broadcast receiving terminal is able to acquire a corresponding broadcast viewing authority.

However, according to the related art, if a term of validity for a broadcast viewing authority expires in the course of viewing a specific broadcast content, it is inconvenient that the currently-viewed broadcast content is forced to end. Therefore, the demand for a terminal user to continue viewing a currently-viewed broadcast content despite the expiration of a validity term of a broadcast viewing authority is rising.

SUMMARY OF THE INVENTION

Accordingly, the one or more embodiments of the present invention is directed to a mobile terminal and method of controlling a broadcast therein that substantially obviate one or more problems due to limitations and disadvantages of the related art.

An object of the one or more embodiments of the present invention is to provide a mobile terminal and method of controlling a broadcast therein, by which a currently-output broadcast content can keep being output despite expiration of a validity term of a broadcast viewing authority.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the an embodiment of the present invention includes a broadcast receiving module configured to receive a first broadcast content according to an acquisition of a first broadcast viewing authority, an output unit configured to output the first broadcast content received by the broadcast receiving module, and a controller configured to determine whether a validity term if the acquired first broadcast viewing authority expires within a broadcast time of the first broadcast content, and if the validity term is determined to expire within the broadcast time of the first broadcast content, control the output unit to display an image for a purchase of the first broadcast content.

In another embodiment of the present invention, a method of controlling a broadcast in a mobile terminal includes acquiring a first broadcast viewing authority, receiving and outputting a first broadcast content if the first broadcast viewing authority is acquired, determining whether a validity term of the acquired first broadcast viewing authority expires within a broadcast time of the output first broadcast content, and if it is determined that the validity term expires within the broadcast time, displaying an image for a purchase of the first broadcast content.

It is to be understood that both the foregoing general description and the following detailed description of the one or more embodiments of the present invention are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the one or more embodiments of the present invention, examples of which are illustrated in the accompanying drawings. It is to be understood by those of ordinary skill in this technological field that other embodiments may be utilized, and structural, electrical, as well as procedural changes may be made without departing from the scope of the one or more embodiments of the present invention. Wherever possible, the same reference numbers will be used throughout the drawings to refer to the same or like parts.

The suffixes ‘module’ and ‘unit’ for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
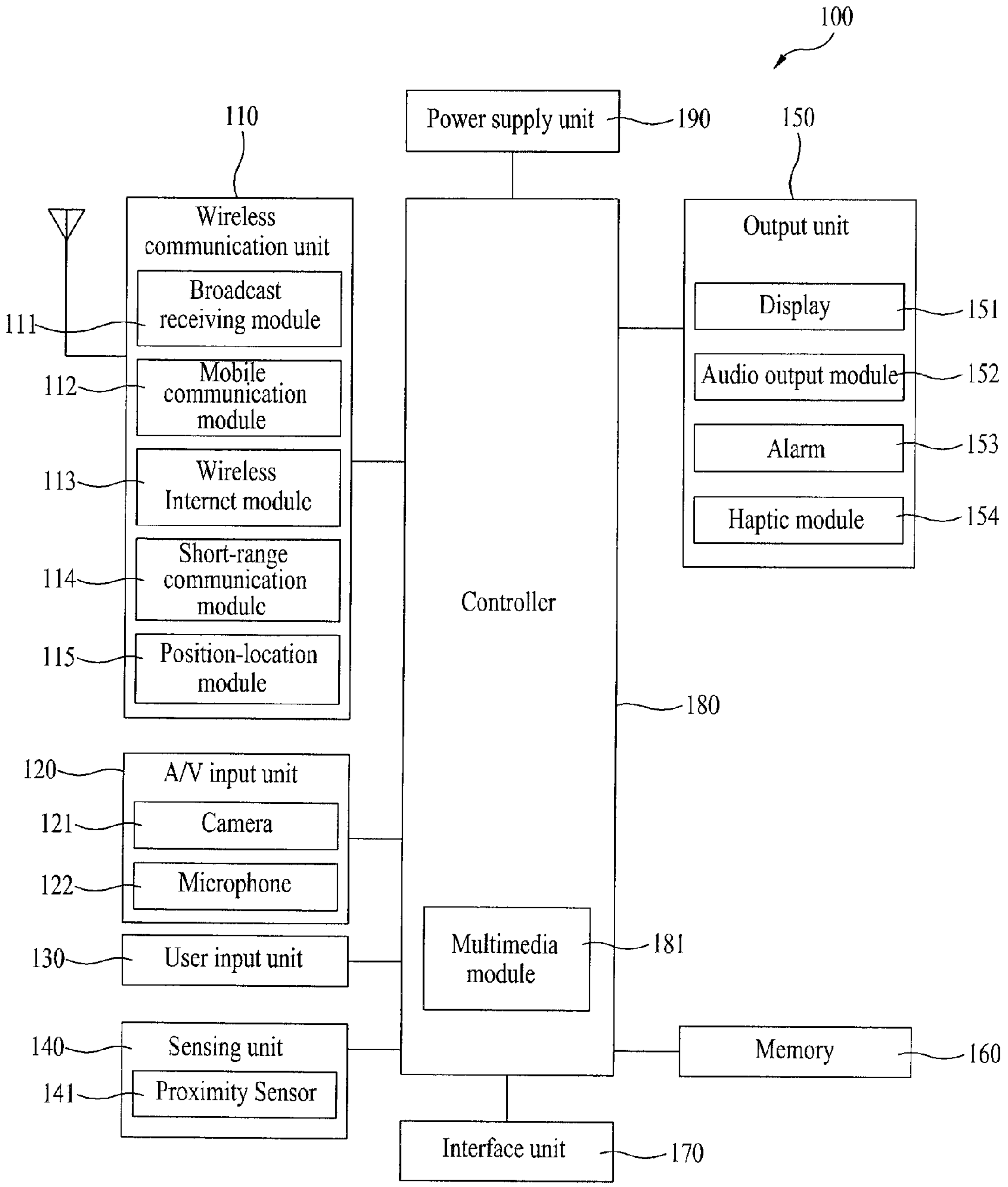
FIG. 1 is a block diagram of a mobile terminal according to one embodiment of the present invention.

FIG. 1 is a block diagram of a mobile terminal according to one embodiment of the present invention. Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented. In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. Also, the broadcast associated information can be provided via a mobile communication network. In this case, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Also, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Also, the sensing unit 140 can include a proximity sensor 141.

The output unit 150 generates outputs relevant to the senses of sight, hearing, touch and the like. Also, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In a case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In a case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. Also, an action that a pointer actually touches the touchscreen is named 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). Also, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. Also, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Also, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
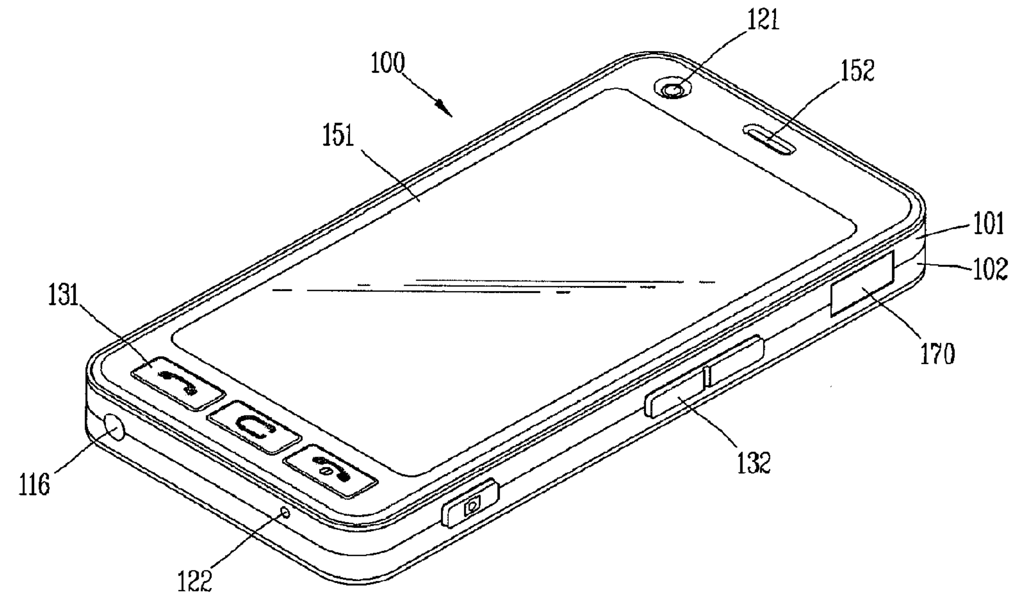
FIG. 2A is a front perspective diagram of a mobile terminal according to one embodiment of the present invention.

FIG. 2A is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101. The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. Also, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. Also, a command for a volume adjustment of sound output from the audio output unit 152, a command for a switching to a touch recognizing mode of the display unit 151 or the like can be inputted to the second manipulating unit 132.

Figure 2B:
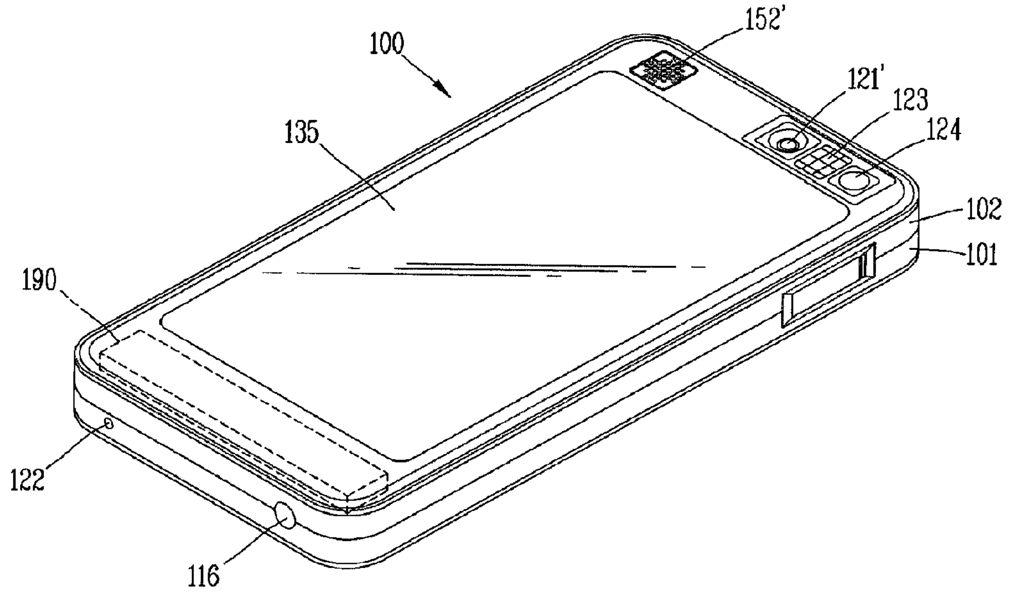
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. Also, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In a case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. Also, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151. Interconnected operational mechanism between the display unit 151 and the touchpad 135 are explained with reference to FIG. 3A and FIG. 3B as follows.

Figure 3A:
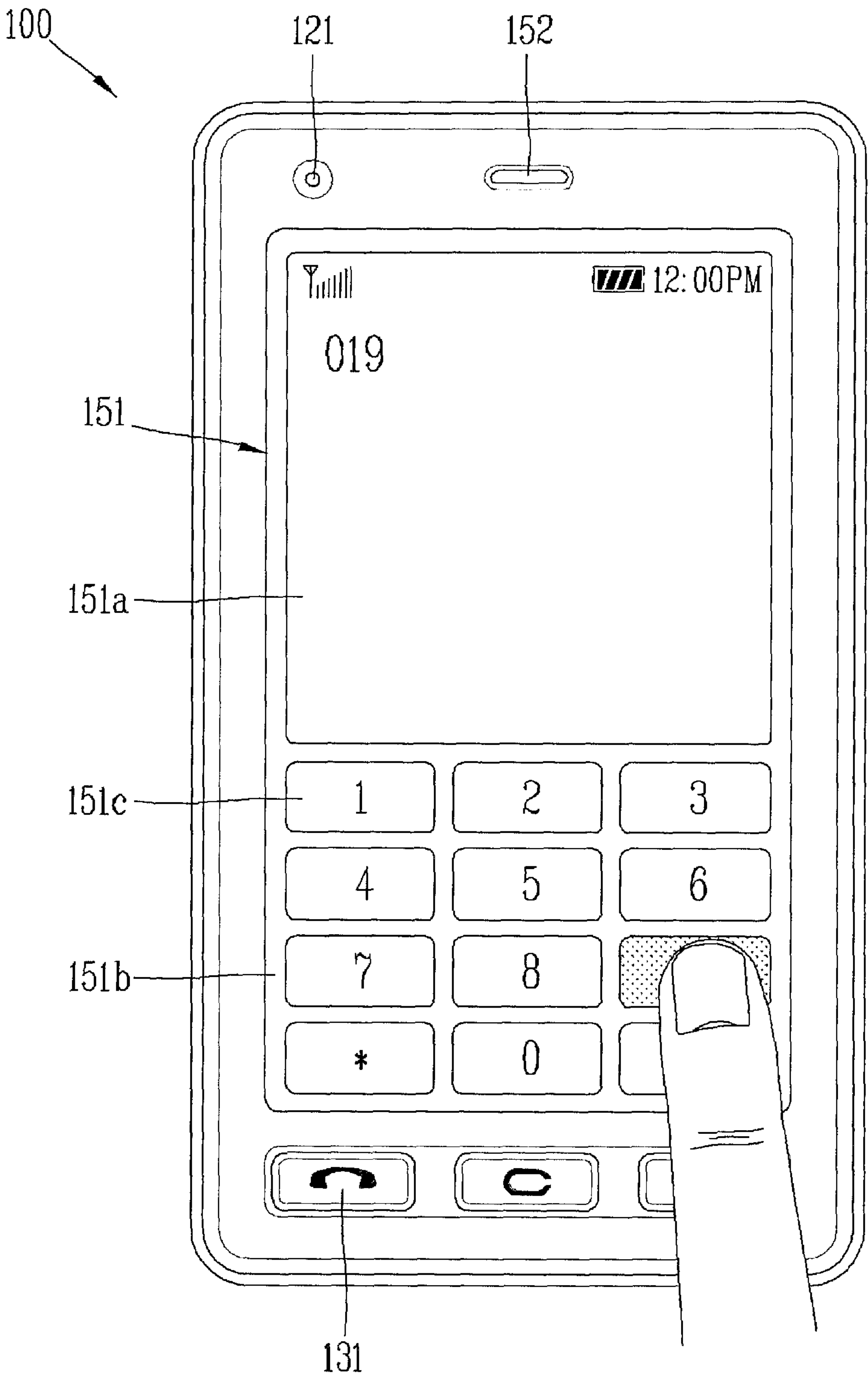
FIG. 3A and FIG. 3B are front diagrams of a mobile terminal according to one embodiment of the present invention for explaining one operational status of the mobile terminal, respectively.
Figure 3B:
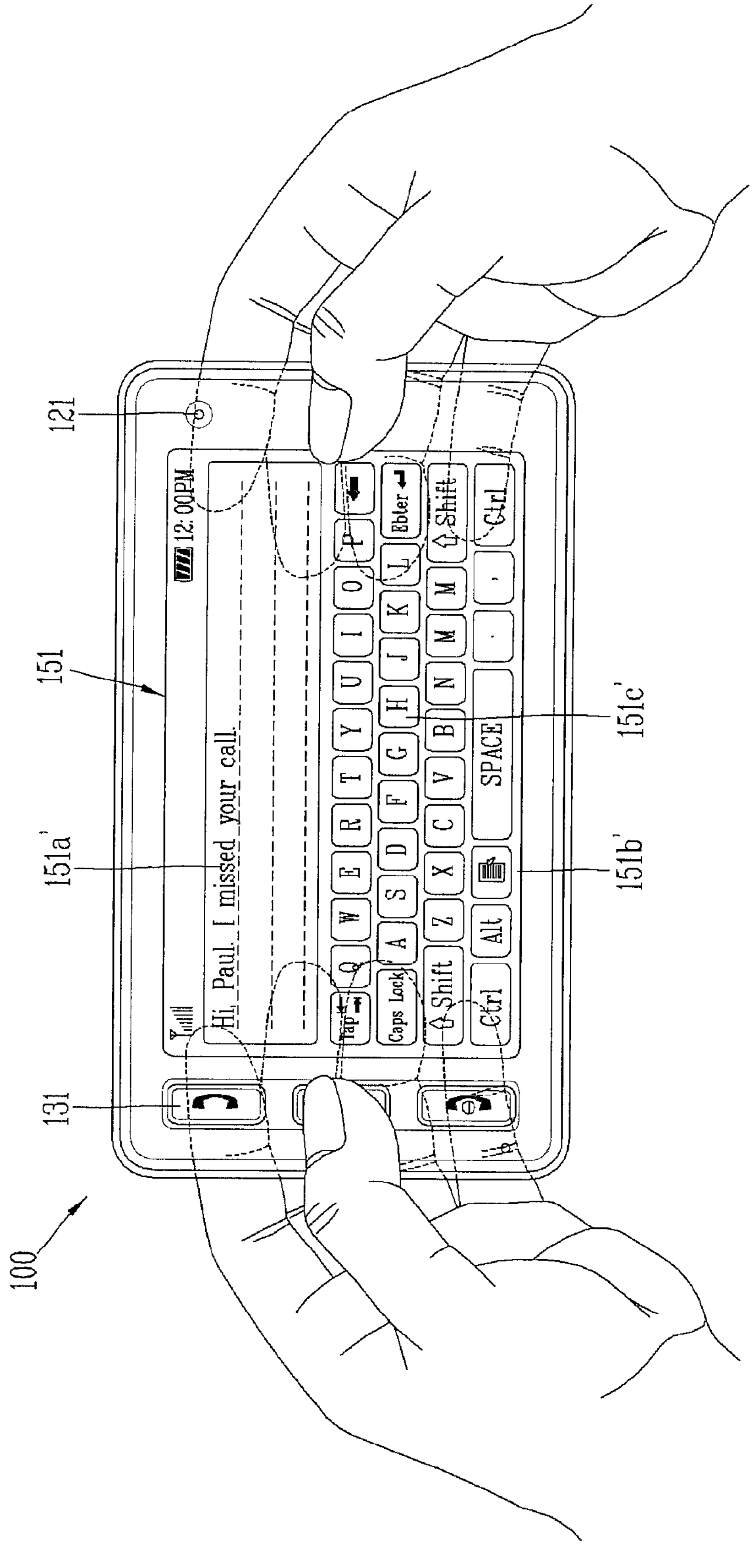

FIG. 3A and FIG. 3B are front-view diagrams of a terminal according to one embodiment of the present invention for explaining an operational state thereof. First of all, various kinds of visual informations can be displayed on the display unit 151. Also, these information can be displayed in characters, numerals, symbols, graphics, icons and the like.

In order to input the information, at least one of the characters, numerals, symbols, graphics and icons are represented as a single predetermined array to be implemented in a keypad formation. Also, this keypad formation can be so-called 'soft keys'.

FIG. 3A shows that a touch applied to a soft key is inputted through a front face of a terminal body. The display unit 151 is operable through an entire area or by being divided into a plurality of regions. In the latter case, a plurality of the regions can be configured interoperable.

For instance, an output window 151*a* and an input window 151*b* are displayed on the display unit 151. A soft key 15*c*' representing a digit for inputting a phone number or the like is output to the input window 151*b*. If the soft key 151*c*' is touched, a digit corresponding to the touched soft key is output to the output window 151*a*. If the first manipulating unit 131 is manipulated, a call connection for the phone number displayed on the output window 151*a* is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). Also, the display unit 151 can be configured to change an output picture according to the arranged direction of the terminal body.

FIG. 3B shows that a text input mode is activated in the terminal. An output window 151*a*' and an input window 151*b*' are displayed on the display unit 151. A plurality of soft keys 151*c*' representing at least one of characters, symbols and digits can be arranged in the input window 151*b*'. The soft keys 151*c*' can be arranged in the QWERTY key formation.

If the soft keys 151*c*' are touched through the touchpad (cf. '135' in FIG. 2B), the characters, symbols and digits corresponding to the touched soft keys are output to the output window 151*a*'. Thus, the touch input via the touchpad 135 is advantageous in that the soft keys 151*c*' can be prevented from being blocked by a finger in case of touch, which is compared to the touch input via the display unit 151. In a case that the display unit 151 and the touchpad 135 are configured transparent, it is able to visually check fingers located at the backside of the terminal body. Hence, more correct touch inputs are possible.

Besides, the display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with a case that both of the display unit (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad 135. The proximity sensor 141 described with reference to FIG. 1 is explained in detail with reference to FIG. 4 as follows.

Figure 4:
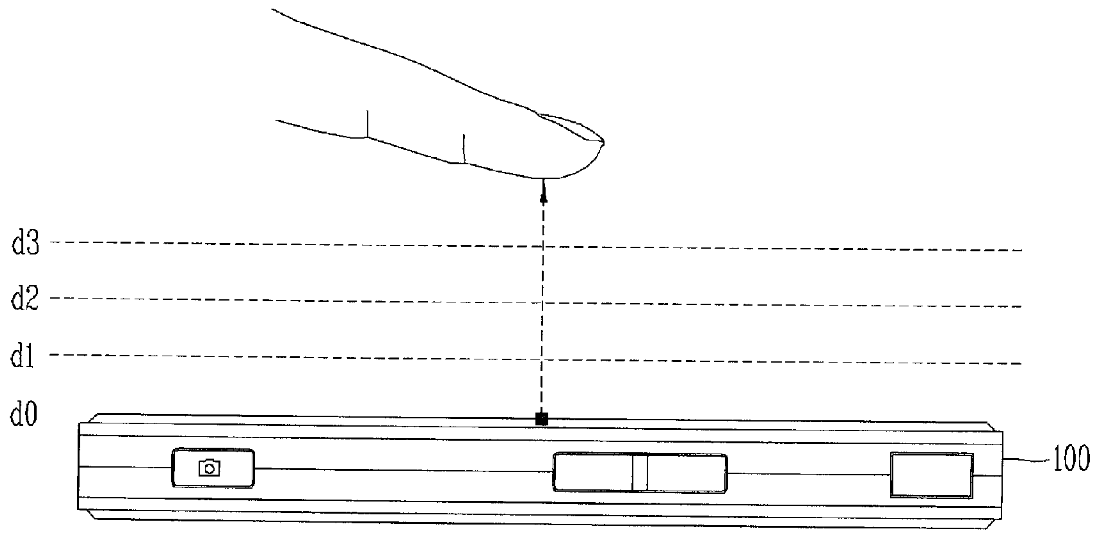
FIG. 4 is a diagram to explain the concept of proximity depth of a proximity sensor.

FIG. 4 is a conceptional diagram for explaining a proximity depth of a proximity sensor. Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. Also, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In a case that the pointer is located to be spaced apart from the touchscreen in a distance smaller than d1, it is recognized as a proximity touch to a first proximity depth. In a case that the pointer is located to be spaced apart from the touchscreen in a distance between d1 and d2, it is recognized as a proximity touch to a second proximity depth. In a case that the pointer is located to be spaced apart from the touchscreen in a distance smaller than d3 or equal to or greater than d2, it is recognized as a proximity touch to a third proximity depth. In a case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. Also, the controller 180 is able to perform various operation controls according to the various input signals.

Figure 5:
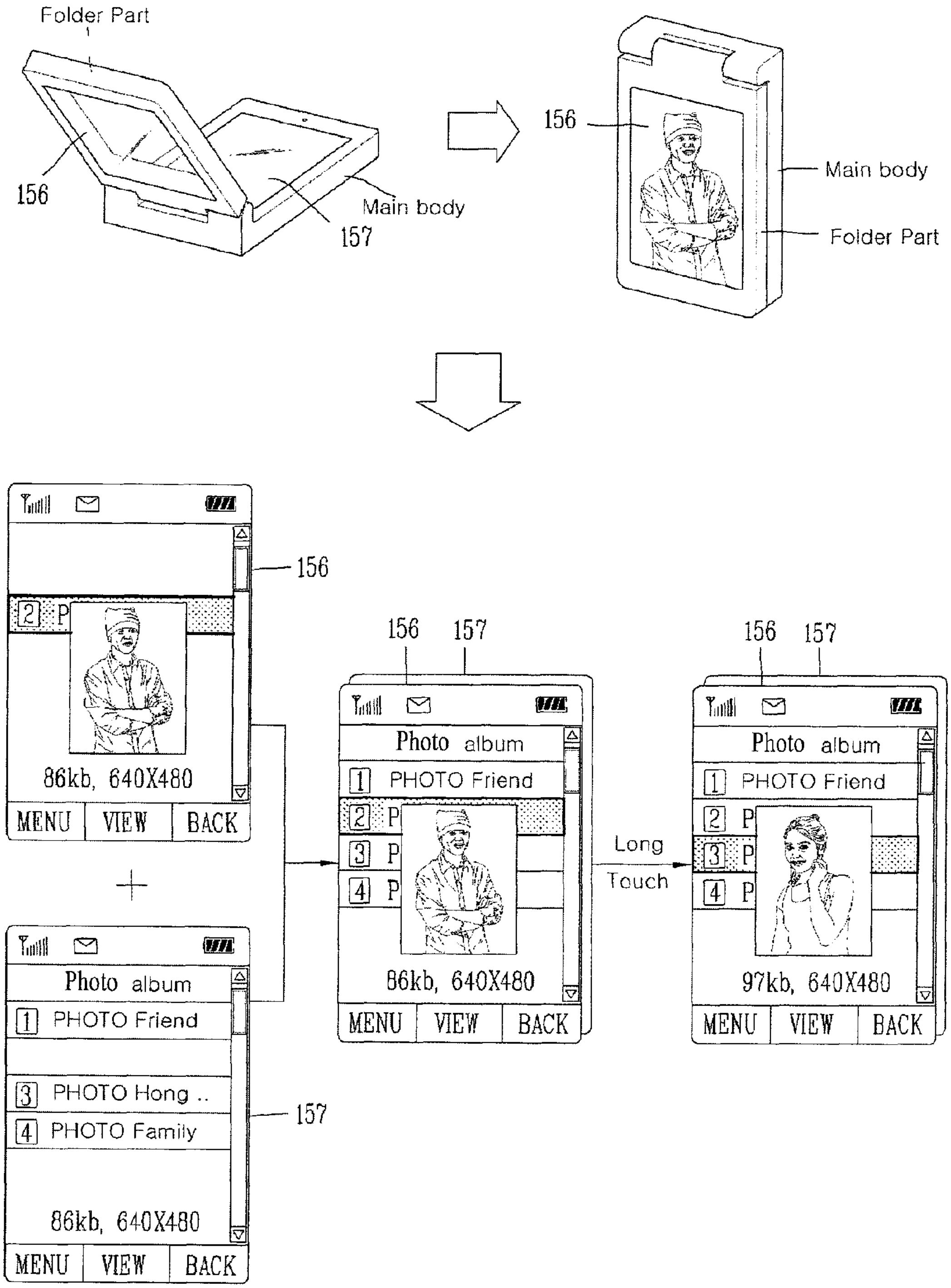
FIG. 5 is a diagram to explain the concept of a method of controlling a touch action on a pair of display units overlapped with each other.

FIG. 5 is a conceptional diagram for exampling a method of controlling a touch action in a state that a pair of display units 155 and 156 is overlapped with each other. Referring to FIG. 5, a terminal shown in the drawing is a folder type terminal in which a folder part is connected to a main body in a manner of being folded or unfolded.

A first display unit 156 provided to the folder part is a light-transmittive or transparent type such as TOLED, while a second display unit 157 provided to the main body may be a non-transmittive type such as LCD. Each of the first and second display units 155 and 156 can include a touch-inputtable touchscreen. For instance, if a touch (contact touch or proximity touch) to the first display unit or TOLED 155 is detected, the controller 180 selects or runs at least one image from an image list displayed on the TOLED 155 according to a touch type and a touch duration.

In the following description, a method of controlling information displayed on a different display unit or an LCD 156 in case of an touch to the TOLED 155 externally exposed in an overlapped configuration is explained, in which the description is made with reference to input types classified into a touch, a long touch, a long-touch & drag and the like.

In the overlapped state (a state that mobile terminal is closed or folder), the TOLED 155 is configured to be overlapped with the LCD 156. In this state, if a touch different from a touch for controlling an image displayed on the TOLED 155, e.g., a long touch (e.g., a touch having a duration of at least 2 seconds) is detected, the controller 180 enables at least one image to be selected from an image list displayed on the LCD 156 according to the touched touch input. The result from running the selected image is displayed on the TOLED 155.

The long touch is usable in selectively shifting a specific one of entities displayed on the LCD 156 to the TOLED 155 (without an action for running the corresponding entity). In particular, if a user performs a long touch on a prescribed region of the TOLED 155 corresponding to a specific entity of the LCD 156, the controller 180 controls the corresponding entity to be displayed by being shifted to the TOLED 155.

Meanwhile, an entity displayed on the TOLED 155 can be displayed by being shifted to the LCD 156 according to such a prescribed touch input to the TOLED 155 as flicking, swirling and the like. In the drawing, exemplarily shown is that a second menu displayed on the LCD 156 is displayed by being shifted to the TOLED 155.

In a case that another input, e.g., a drag is additionally detected together with a long touch, the controller 180 executes a function associated with an image selected by the long touch so that a preview picture for the image can be displayed on the TOLED 155 for example. In the drawing, exemplarily shown is that a preview (picture of a male) for a second menu (image file) is performed.

While the preview image is output, if a drag toward a different image is additionally performed on the TOLED 155 by maintaining the long touch, the controller 180 shifts a selection cursor (or a selection bar) of the LCD 156 and then displays the image selected by the selection cursor on the preview picture (picture of female). Thereafter, after completion of the touch (long touch and drag), the controller 180 displays the initial image selected by the long touch.

The touch action (long touch and drag) is identically applied to a case that a slide (action of a proximity touch corresponding to the drag) is detected to together with a long proximity touch (e.g., a proximity touch maintained for at least 2 or 3 seconds) to the TOLED 155. In a case that a touch action differing from the above-mentioned touch actions is detected, the controller 180 is able to operate in the same manner of the general touch controlling method.

The method of controlling the touch action in the overlapped state is applicable to a terminal having a single display. Also, the method of controlling the touch action in the overlapped state is applicable to terminals differing from the folder type terminal having a dual display as well.

Figure 6A:
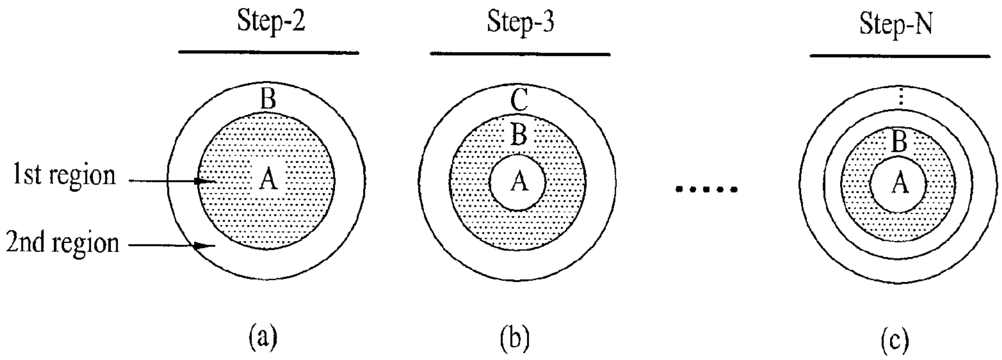
FIG. 6A and FIG. 6B are diagrams to explain the concepts of a proximity touch recognizing area for detecting a proximity signal and a haptic area for generating a tactile effect, respectively.
Figure 6B:
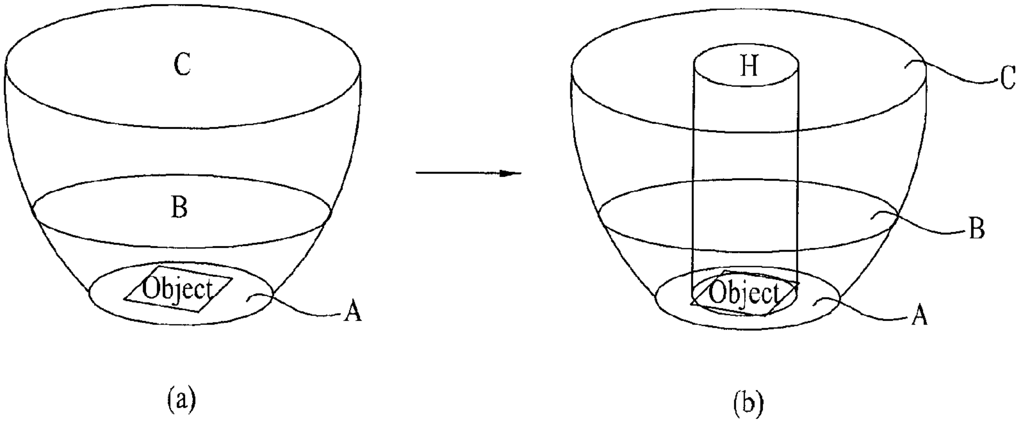

FIG. 6A and FIG. 6B are diagrams for the description of a proximity touch recognition area and a tactile effect generation region. FIG. 6A represents such an object as an icon, a menu item and the like in a circle type for clarity and convenience of explanation.

A region for displaying an object on the display unit 151, as shown in (a) of FIG. 6A, can be divided into a first region A at a central part and a second region B enclosing the first region A. The first and second regions A and B can be configured to generate tactile effects differing from each other in strength or pattern. For instance, the firs and second regions can be configured to generate 2-step vibrations in a manner of outputting a first vibration if the second region B is touched or outputting a second vibration greater than the first vibration if the first region A is touched.

In a case that both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For instance, in (a) of FIG. 6A, it is able to set the proximity touch recognition region to the area including both of the first and second regions A and B. Also, it is able to set the haptic region to the first region A.

It is able to discriminate the region having the object displayed therein into three regions A, B and C as shown in (b) of FIG. 6A. Alternatively, it is able to discriminate the region having the object displayed therein into N regions (N>4) as shown in (c) of FIG. 6A. Also, it is able to configure each of the divided regions to generate a tactile effect having a different strength or pattern. In a case that a region having a single object represented therein is divided into at least three regions, it is able to set the haptic region and the proximity touch recognition region to differ from each other according to a use environment.

It is able to configure a size of the proximity touch recognition region of the display unit 151 to vary according to a proximity depth. In particular, referring to (a) of FIG. 6B, the proximity touch recognition region is configured to decrease by C→B→A according to the proximity depth for the display unit 151. On the contrary, the proximity touch recognition region is configured to increase by C→B→A according to the proximity depth for the display unit 151. Despite the above configuration, it is able to set the haptic region to have a predetermined size, as the region ‘H’ shown in (b) of FIG. 6B, regardless of the proximity depth for the display unit 151.

In a case of dividing the object-displayed region for the setting of the haptic region or the proximity touch recognition region, it is able to use one of various schemes of horizontal/vertical division, radial division and combinations thereof as well as the concentric circle type division shown in FIG. 6A.

Figure 7A:
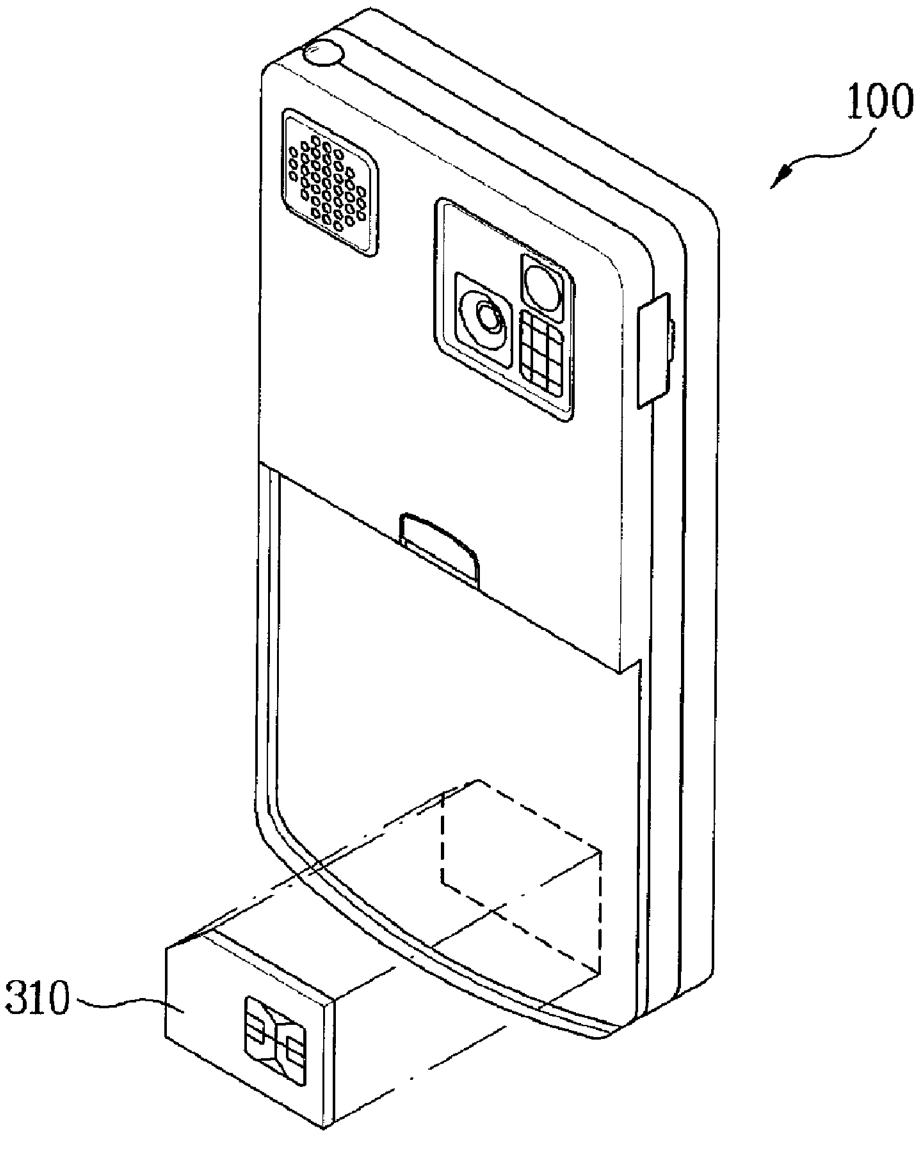
FIG. 7A and FIG. 7B are perspective diagrams of a mobile terminal according to one embodiment of the present invention, in which a process for assembling an identity device to the mobile terminal is shown.
Figure 7B:
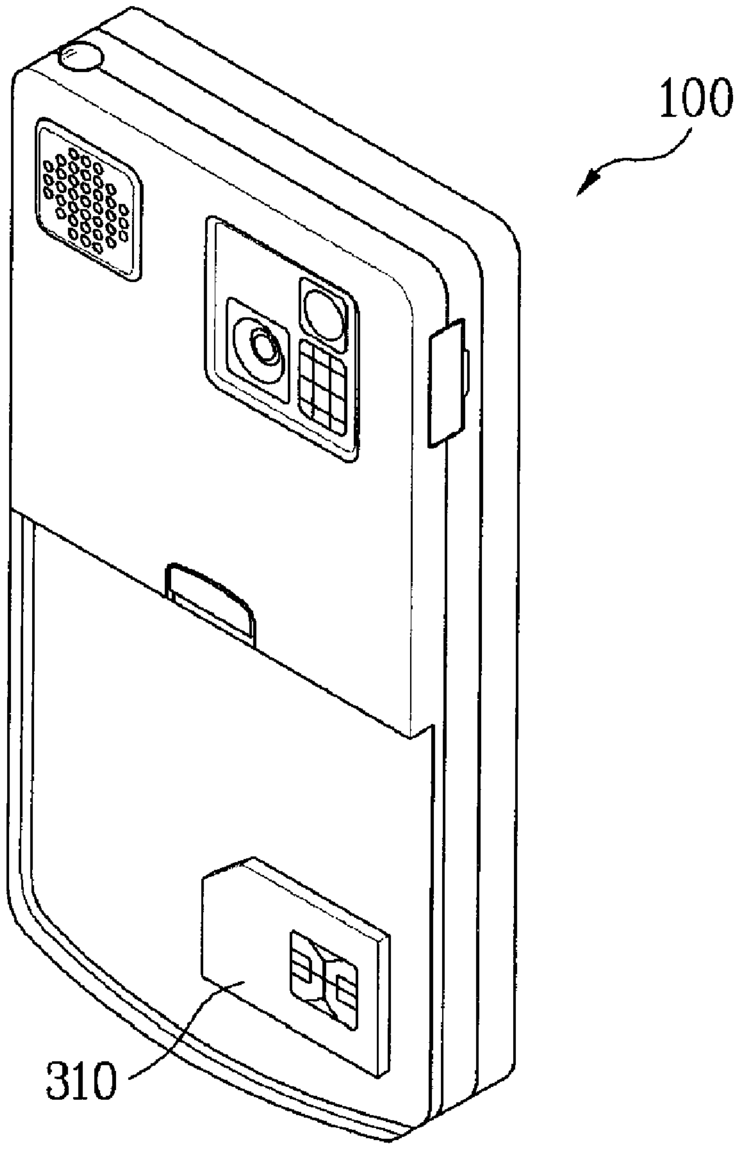

FIG. 7A and FIG. 7B are perspective diagrams of a mobile terminal according to one embodiment of the present invention, in which a process for assembling an identity device to the mobile terminal is shown. In this case, the identity device can include a SIM card for example.

Referring to FIG. 7A and FIG. 7B, an identity device 310 is detachably loaded in a mobile terminal 100. Hence, a new identity device can be loaded in the mobile terminal 100 to replace an old identity device. Of course, the identity device 310 can be loaded in the mobile terminal 100 in a manner of being connected to an interface unit 170. Alternatively, the identity device 310 can be loaded in the mobile terminal in a manner of being connected to a connector separately provided for the connection to the identity device 310.

The mobile terminal 100 is able to authenticate an overall use authority for the mobile terminal or a broadcast viewing/purchase authority via the mobile terminal 100, using the identity device 310. Also, a connecting means (not shown in the drawings) for connecting the identity device 310 and the mobile terminal 100 together can be provided to any portion of the mobile terminal 100 such as a back side, a lateral side, a front side and the like.

Moreover, although FIG. 7A and FIG. 7B show the status for detachably loading the identity device in the mobile terminal, it can be understood that the one or more embodiments of the present invention is applicable to a mobile terminal failing to be provided with a detachable identity device. For convenience and clarity of the following description, assume then a mobile terminal is able to include at least one of the elements shown in FIG. 1.

Also, a broadcast content mentioned in the following description can refer to a broadcast program configured with a broadcast signal transmitted to a terminal from a broadcast managing server on a broadcast channel. In this case, the broadcast managing server is a subject for producing or supplying a broadcast program and may refer to a subject for supplying a broadcast signal to terminal(s) belonging to a broadcast network on at least one broadcast channel.

Figure 8:
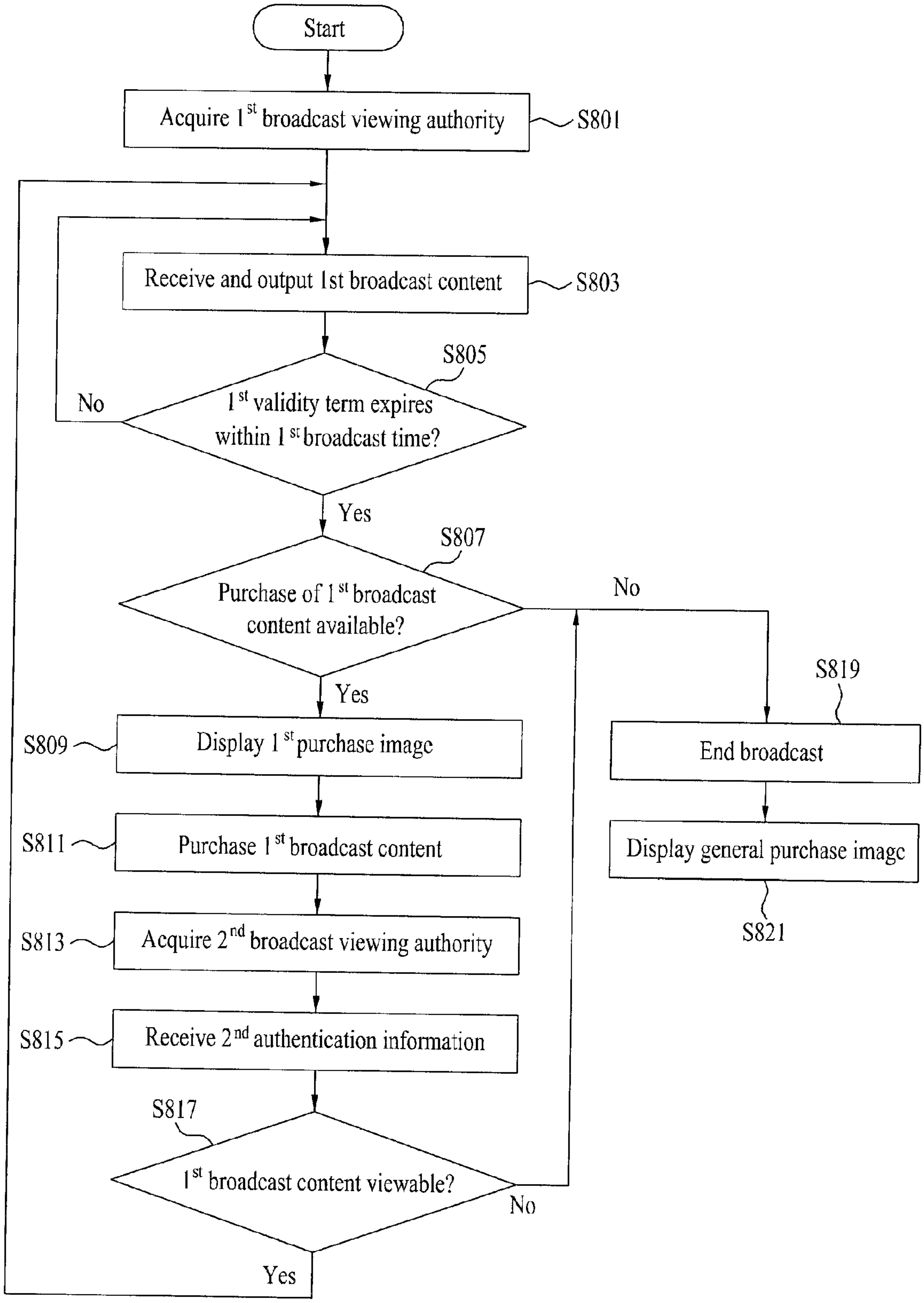
FIG. 8 is a flowchart for a method of controlling a broadcast in a mobile terminal according to one embodiment of the present invention.

FIG. 8 is a flowchart for a method of controlling a broadcast in a mobile terminal according to one embodiment of the present invention. Referring to FIG. 8, the mobile terminal 100 acquires a first broadcast viewing authority, under the control of the controller 180 [S801].

In this case, it is able to acquire the broadcast viewing authority if a specific broadcast product is purchased using the mobile terminal 100. The mobile terminal 100 displays a broadcast product purchase image on the display unit 11 so that a broadcast product selected via the purchase image by a user can be purchased.

For instance, the broadcast products can include a single broadcast content, a plurality of broadcast contents, a broadcast product having an actual viewable time (e.g., 1 hour, a day, 1 week, etc.) set for random broadcast channel(s), a broadcast product having a predetermined viewable period (e.g., Jan. 1 to Jan. 7, 2008, etc.) for random broadcast channel(s), and the like.

Specifically, it is preferable that the one or more embodiments of the present invention are applied to a broadcast viewing authority having a predetermined validity term. Therefore, the one or more embodiments of the present invention are applicable to a case of purchasing a broadcast product having an actual viewing period or a viewable time.

The mobile terminal 100 stores information on the acquired first broadcast viewing authority in the memory 160 or the identity device 310, under the control of the controller 180. Specifically, in case that the acquired first broadcast viewing authority is stored in the identity device 310, the identity device 310 can have a SIM card type.

For instance, the information of the first broadcast viewing authority can include a broadcast product name corresponding to the first broadcast viewing authority, a validity term (start and expiration timing points included), a remaining term of validity, a broadcast product price, broadcast associated information (broadcast content name, corresponding broadcast channel, broadcast time, etc. included), and the like.

In a case of acquiring the first broadcast viewing authority in the acquiring operation S801, the mobile terminal 100 receives a first broadcast content via the broadcast receiving module 111 and then outputs the received first broadcast content via the output unit 153 [S803]. In doing so, the mobile terminal 100 decodes the received first broadcast content into an outputtable format using the controller 180 or a decoder (not shown in the drawing) and is then able to output the decoded first broadcast content via the output unit 153.

The mobile terminal 100 is able to receive and output a specific broadcast content (or, a broadcast content on a specific broadcast channel) corresponding to the first broadcast viewing authority during a validity term of the first broadcast viewing authority (hereinafter named ‘first validity term).

Generally, a broadcast content can include an audio signal and a video signal. The mobile terminal 100 outputs an audio signal of the first broadcast content using the audio output module 152 and also outputs a video signal of the first broadcast content using the display unit 151.

Subsequently, the mobile terminal 100 determines whether the first validity term expires within a broadcast time (hereinafter called ‘first broadcast time’) of the first broadcast content which is being output in the outputting operation S803 [S805]. In this case, the determining operation S805 can be performed by the controller 180.

The mobile terminal 100 receives broadcast associated information via the broadcast receiving module 111 and is then able to store the received broadcast associated information in the memory 160. For instance, the broadcast associated information can include such information associated with a broadcast channel/broadcast content as a broadcast channel/broadcast content name, per-broadcast content broadcast time (start and end times included), broadcast content synopsis/character information, etc. Specifically, the broadcast associated information can be provided in a type of an electronic program guide (EPG), an electronic service guide (ESG), a service guide (SG) or the like.

Prior to performing the determining operation S805, the controller 180 is able to obtain a remaining broadcast time (hereinafter named ‘first remaining broadcast time’) in the first broadcast time or an end time of the first broadcast time (hereinafter named ‘first end time’) from the broadcast time information of the first broadcast content in the broadcast associated information stored in the memory 160. Moreover, the controller 180 is able to obtain a remaining validity term in the first validity term (hereinafter named ‘first remaining validity term) or an expiration timing point of the first validity term (hereinafter named ‘first expiration timing point’) from the validity term information of the first broadcast viewing authority stored in the memory 160 or the identity device 310.

Hence, the controller 180 determines whether the first remaining broadcast time is greater than the first remaining validity term. If the first remaining broadcast time is determined greater than the first remaining validity term, the controller is able to determine that the first validity term expires within the first broadcast time.

The mobile terminal 100 is able to perform the determining operation S805 at a time within a predetermined time from an expiration timing point of the first validity term, if an output of the first broadcast content is detected and/or a command signal for comparison between a broadcast time and a validity term is externally inputted.

For instance, the controller 180 is able to set up a timing point of executing the determining operation S805 according to a selection made by a user through the user input unit 130. In particular, the user is able to select the timing point of the execution of the determining operation S805 as ‘within 5 minutes from the first expiration timing point’, ‘within 10 minutes from the first expiration timing point’, ‘timing point of outputting broadcast content’, and the like. Therefore, the controller 180 is able to execute the determining operation S805 at the timing point set up by the user. In one or more embodiments of the present invention, the controller 180 is able to execute the determining operation S805 at a default timing point or at various time intervals.

Alternatively, if a key (or, a key region) for inputting a command signal for comparison between a broadcast time and a validity term or a menu item is selected by a user, the mobile terminal 100 is able to perform the determining operation S805.

If the mobile terminal 100 determines that the first validity term expires within the first broadcast time, as a result of the determining operation S805, the mobile terminal 100 determines whether the first broadcast content can be purchased, under the control of the controller [S807].

In the determining operation S807, the mobile terminal 100 is able to determine whether a broadcast product containing the first broadcast content can be purchased. For instance, the mobile terminal 100 is able to determine whether it is able to purchase a broadcast product including the first broadcast content only, a broadcast product including a plurality of broadcast contents as well as the first broadcast content or a broadcast product enabling a broadcast channel for providing the first broadcast content to be viewable during a predetermined term.

Moreover, the information on availability for a purchase of the first broadcast content can be included in the broadcast associated information, the first broadcast viewing authority associated information or the like. Besides, the mobile terminal 100 makes a request for a presence or non-presence of availability for the purchase of the first broadcast content to the broadcast managing server and is then able to receive the information containing the presence or non-presence of the availability for the purchase of the first broadcast content from the broadcast managing server.

Meanwhile, if it is determined that the first validity term does not expire within the first broadcast time as a result of the determining operation S805, the mobile terminal is able to return to the outputting operation S803, under the control of the controller 180.

As a result of the determining operation S807, if it is available for the purchase of the first broadcast content, the mobile terminal 100 displays an image for the purchase of the first broadcast content (hereinafter named 'first purchase image') via the display unit 151 [S809].

For instance, the first purchase image can include a name, broadcast time, fee information of the first broadcast content and/or the like. For instance, in order to avoid interrupting a broadcast viewing, the first purchase image can be displayed by screen division, popup window, overlay, OSD (on screen display) or the like.

The mobile terminal 100 is able to display the first purchase image at least one of a timing point within a predetermined time from an expiration timing point of the first validity term, an expiration timing point of the first validity term and a timing point of completion of the determining operation S805, under the control of the controller 180.

The mobile terminal 100 purchases the first broadcast content via the first purchase image, under the control of the controller 180 [S811]. If 'purchase consent' is selected by a user via the first purchase image, the mobile terminal 100 makes a request for a purchase of the first broadcast content to the broadcast managing server via the wireless communication unit 110. If a purchase approval is acquired from the broadcast managing server, the mobile terminal 100 is able to complete the purchase of the first broadcast content.

In the following description, explained in detail with reference to FIGS. 10A to 14 is a screen configuration for displaying a purchase image according to whether a validity term expires within a broadcast time in the mobile terminal 100. Moreover, when a broadcast content is purchased via a purchase image in the mobile terminal 100, corresponding screen configurations are explained in detail with reference to FIGS. 15A to 16.

Figure 13:
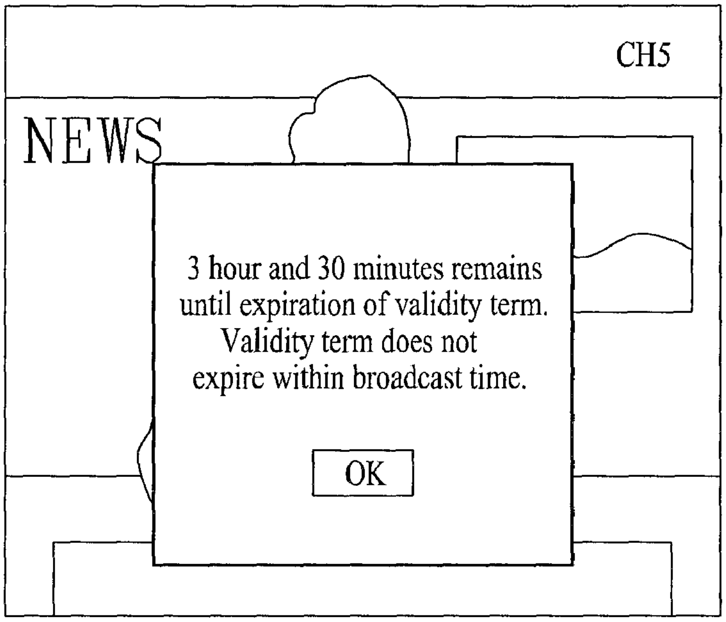
Figure 14:
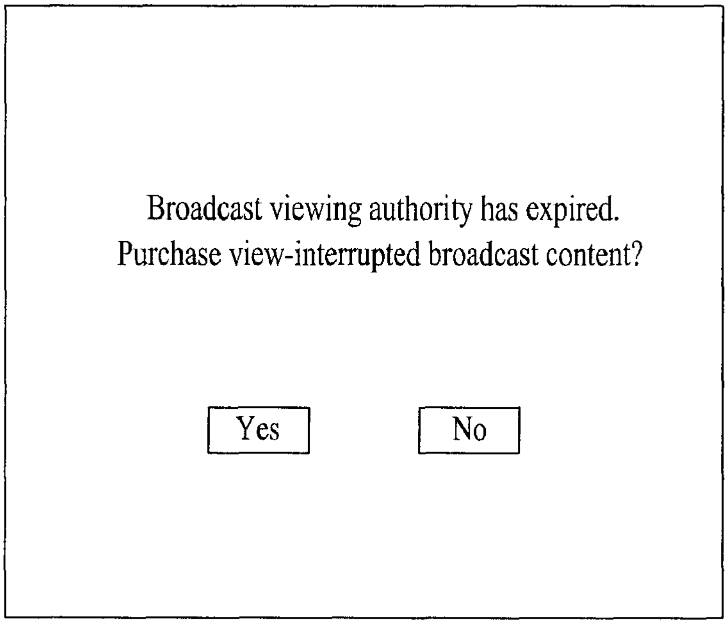
Figure 15A:
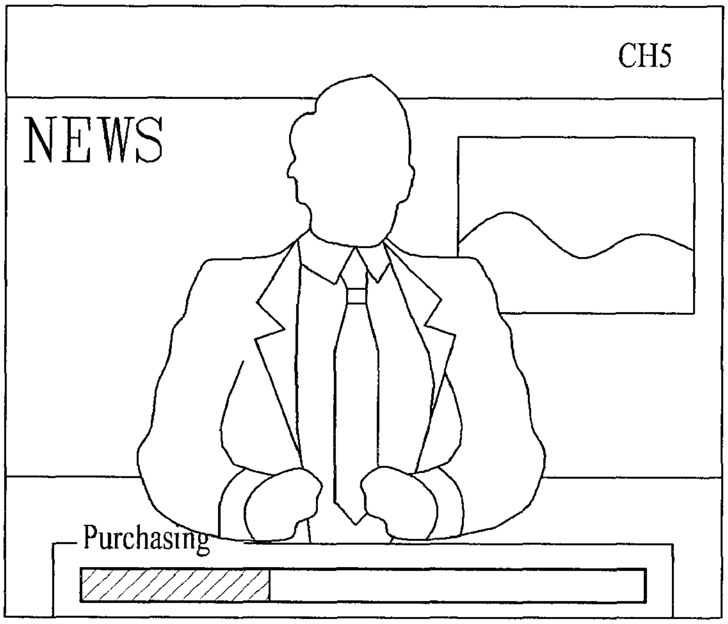
FIGS. 15A to 16 are diagrams for a screen configuration in case that a broadcast content is purchased through a purchase image in a mobile terminal according to one embodiment of the present invention.
Figure 15B:
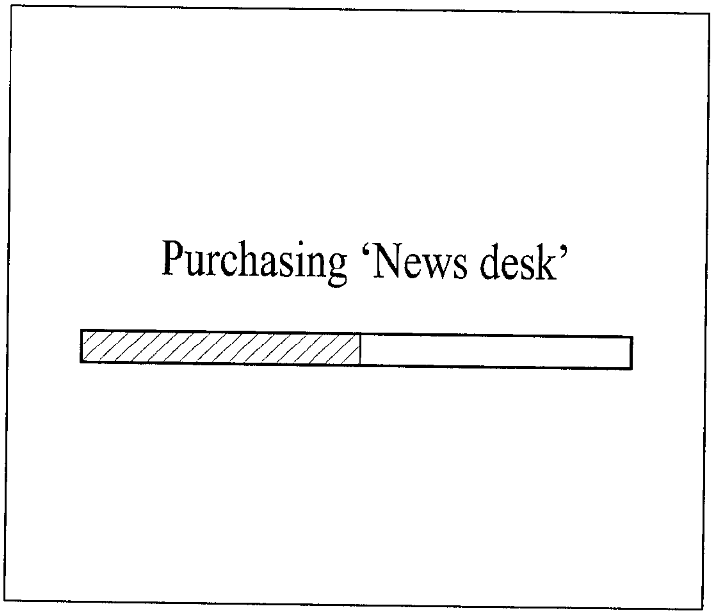
Figure 16:
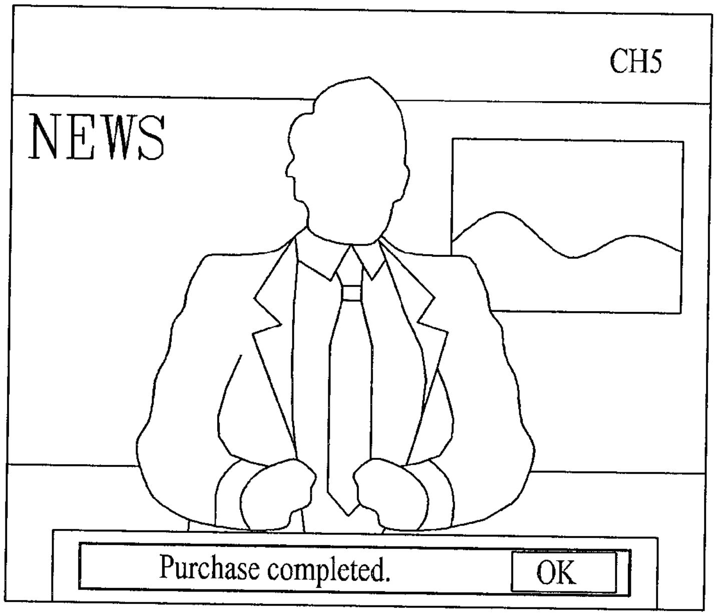

FIGS. 10A to 14 are diagrams of a screen on which a purchase image is displayed according to a presence or non-presence of expiration of a validity term within a broadcast time in a mobile terminal according to one embodiment of the present invention, and FIGS. 15A to 16 are diagrams for a screen configuration in case that a broadcast content is purchased through a purchase image in a mobile terminal according to one embodiment of the present invention. In embodiments of the present invention, the purchase image of the program may include an image of the program, or other indicia of the program, such as symbol, text, graphic, and/or icon related to the program.

Figure 10A:
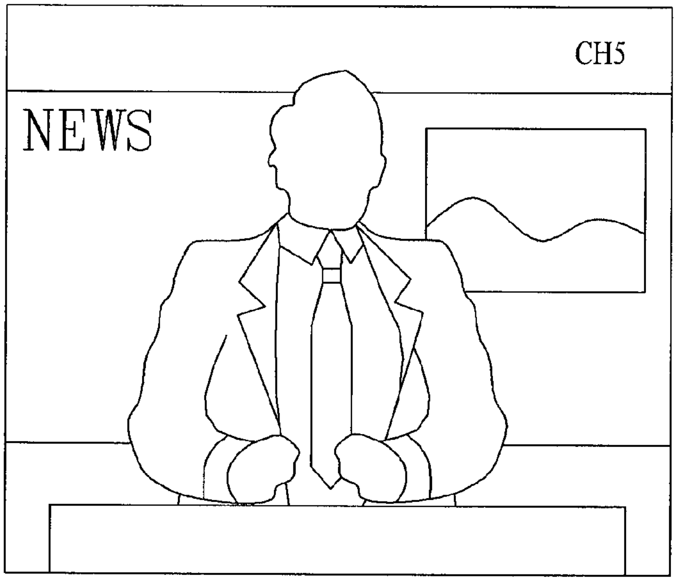
FIGS. 10A to 14 are diagrams of a screen on which a purchase image is displayed according to a presence or non-presence of expiration of a validity term within a broadcast time in a mobile terminal according to one embodiment of the present invention.

First of all, the mobile terminal 100 is able to display an image according to a result of comparison between a first broadcast time and a first validity term at a timing point within a predetermined time from an expiration timing point of the first validity term in the course of outputting a first broadcast content [FIG. 10A].

Figure 10B:
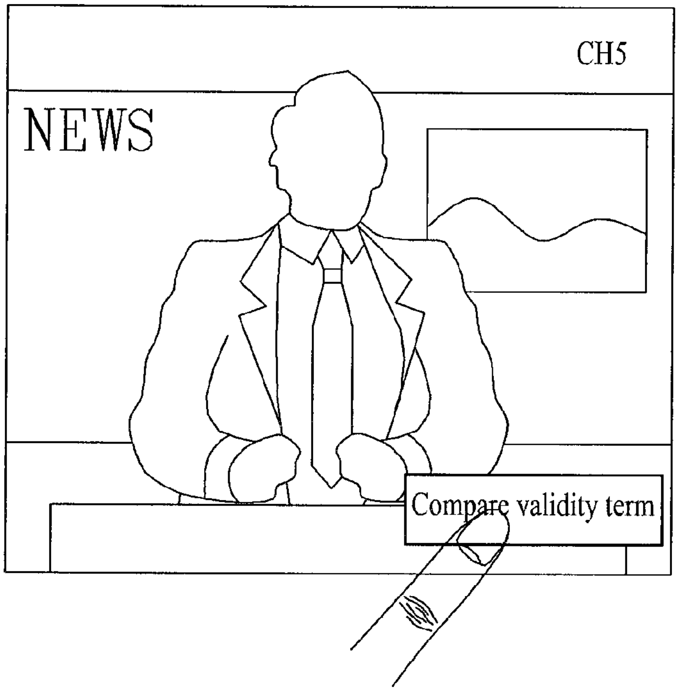

Alternatively, while a first broadcast content is being output, if a command signal for a comparison between a first broadcast time and a first validity term is inputted by a user [FIG. 10B], the mobile terminal 100 is able to display an image according to the result of the comparison between the first broadcast time and the first validity term.

Figure 10C:
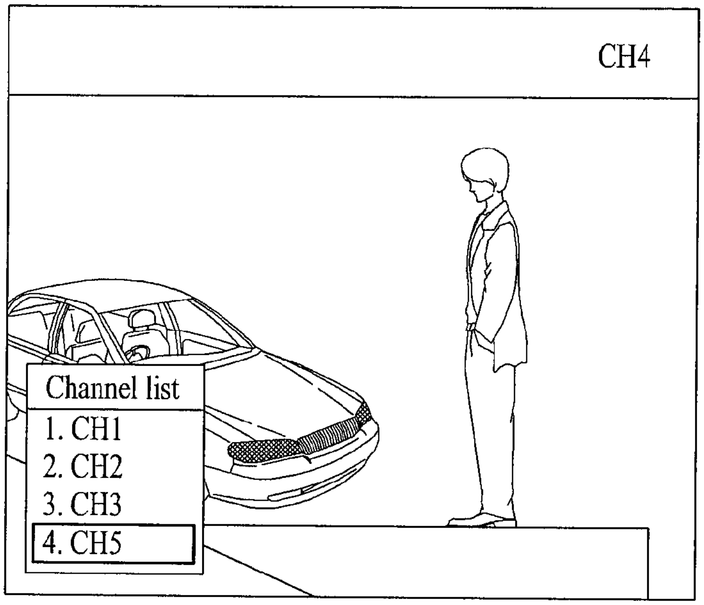

Alternatively, while a different broadcast content is being output (i.e., CH4), if a switching to a broadcast channel (i.e., CH5) for outputting a first broadcast content is selected [FIG. 10C], the mobile terminal 100 is able to display an image according to the result of the comparison between a first broadcast time and a first validity term.

Figure 11:
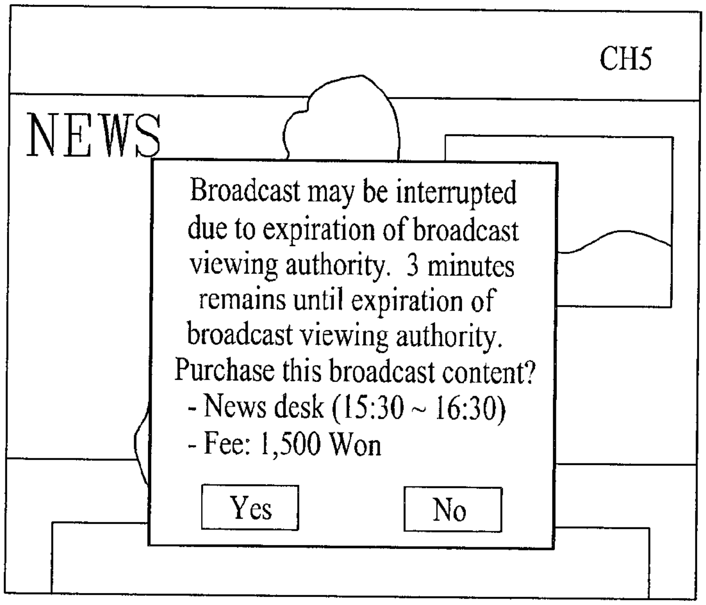
Figure 12:
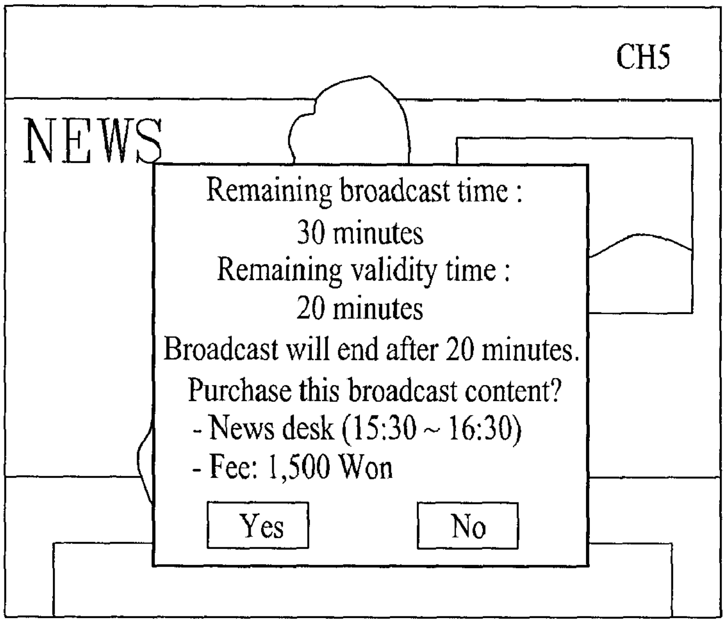

As a result of the comparison between the first broadcast time and the first validity term, if the first validity term expires within the first broadcast time, the mobile terminal is able to display a first purchase image shown in FIG. 11 or FIG. 12.

For instance, the first purchase image includes a first remaining validity term, a first remaining broadcast time and a text indicating that the first validity term expires within the first broadcast time, and also includes purchase information such as name/viewable term/fee information of the first broadcast content.

Meanwhile, as a result of the comparison between the first broadcast time and the first validity term, if the first validity term does not expire within the first broadcast time, the mobile terminal 100 is able to display a text indicating that the first validity term is not going to expire within the first broadcast time, as shown in FIG. 13. Optionally, in order to avoid interrupting a broadcast viewing, this text need not be output. In other embodiments, the text, or other indicia that the first validity term is not going to expire within the first broadcast time may be displayed or indicated unobtrusively, such as, being displayed in a corner of a screen, in a split screen, audibly by a chime or other sound, and/or tactilely by vibration or other movement of the mobile terminal 100.

Moreover, as a result of the comparison between the first broadcast time and the first validity term, if the first validity term expires within the first broadcast time, the mobile terminal 100 is able to display a first purchase image, as shown in FIG. 14, at an expiration timing point of the first validity term.

If 'purchase consent (yes)' is selected in FIG. 11 or FIG. 12, the mobile terminal 100 is able to perform a process for purchasing the first broadcast content while outputting the first broadcast content [FIG. 15A]. In doing so, the mobile terminal 100 displays an indicator indicating a purchase process extent (or an extent to which the purchase has proceeded) on a portion of the screen, or need not display information on the purchase process extent to avoid or lessen interrupting the broadcast viewing.

If 'purchase consent (yes)' is selected in FIG. 14, the mobile terminal 100 is able to display an indicator indicating a purchase process extent on a portion of the screen while performing a process for purchasing the first broadcast content [FIG. 15B].

If the purchase process is completed in FIG. 15A or FIG. 15B, the mobile terminal 100 is able to announce the purchase completion of the first broadcast content while outputting the first broadcast content [FIG. 16]. In doing so, the mobile terminal 100 need not display information on the purchase completion to avoid interrupting the broadcast viewing.

Referring back to FIG. 8, as the first broadcast content is purchased via the first purchase image [S811], the mobile terminal 100 acquires a second broadcast viewing authority for the first broadcast content, under the control of the controller 180 [S813]. Generally, it is able to perform a purchase of a broadcast content using WAP (wireless access protocol) or HTTP (hypertext transfer protocol).

Since the purchase process for the first broadcast content is performed as a background, a viewing of the first broadcast content is not interrupted. Yet, in order to announce that the purchase of the first broadcast content is in progress within a range of minimizing the viewing interruption of the first broadcast content, it is able to schematically display an icon, a text, and/or other indicia on a portion of the screen.

Therefore, after the acquisition of the second broadcast viewing authority, the mobile terminal 100 is able to possess (or obtain) both of the first and second broadcast viewing authorities for the first broadcast content during a period in which the first broadcast time and the first validity term are overlapped with each other (i.e., before expiration of the first validity term).

In particular, in outputting the first broadcast content, the mobile terminal 100 uses the first broadcast viewing authority for the first validity term and is able to use the second broadcast viewing authority for the period from the expiration of the first validity term to an end timing point of the first broadcast time. Accordingly, the second broadcast viewing authority, or a portion thereof, can be used to view a remaining portion of the first broadcast content. In one or more embodiments of the present invention, the second broadcast viewing authority can have a term that is just enough to view the remaining portion of the first broadcast content.

Moreover, the mobile terminal 100 is able to determine a time from an expiration timing point of the first validity term to an end timing point of the first broadcast time (hereinafter named 'first purchase request time'). This is because a different purchase amount (fee) can be charged according to a size of the determined time in purchasing the first broadcast content in the purchasing operation S811. For instance, it is able to charge a purchase amount in proportion to a purchase request time.

In the following description, a screen configuration for charging a purchase amount of a broadcast content differently according to a purchase request time in a mobile terminal 100 is explained in detail with reference to FIG. 17A and FIG. 17B.

For convenience and clarity of the following description, assume that a first broadcast content is 'News desk' (e.g., a news program) and assume that 250 Won is charged per 10 minutes. It is understood that other types of programs or content, other types of currency or units of value, and other increments of time, are within the scope of the one or more embodiments of the present invention.

The mobile terminal 100 is able to announce that a purchase amount of the first broadcast content is charged differently in proportion to a first purchase request time via a first purchase image.

Figure 17A:
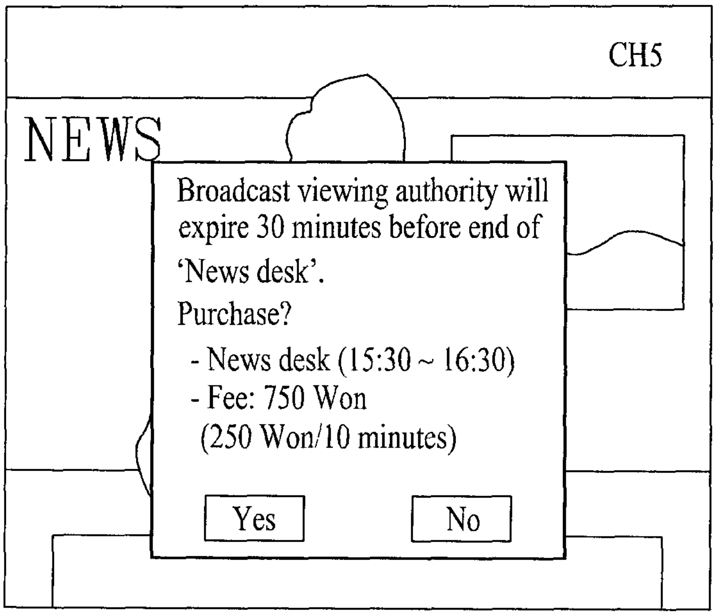
FIG. 17A and FIG. 17B are diagrams of a screen on which a process for charging a purchase fee of a broadcast content differently according to a time between a validity expiration timing point and a broadcast end timing point in a mobile terminal according to one embodiment of the present invention is displayed.
Figure 17B:
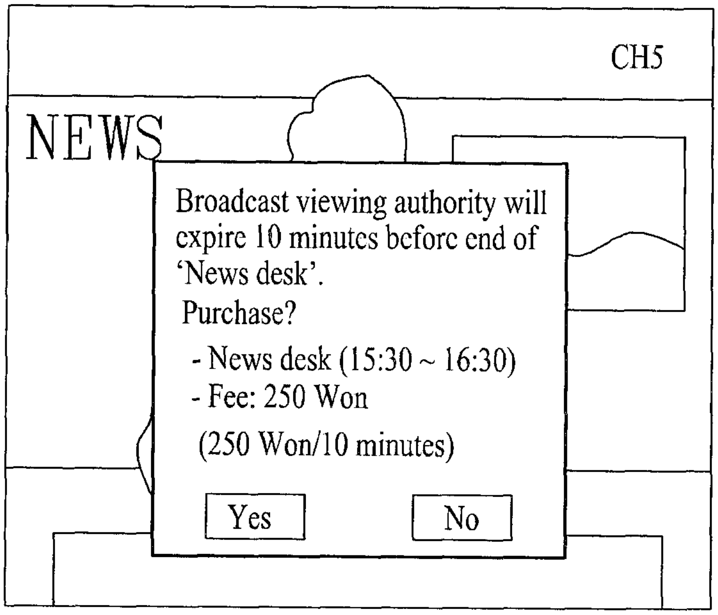
Figure 18:
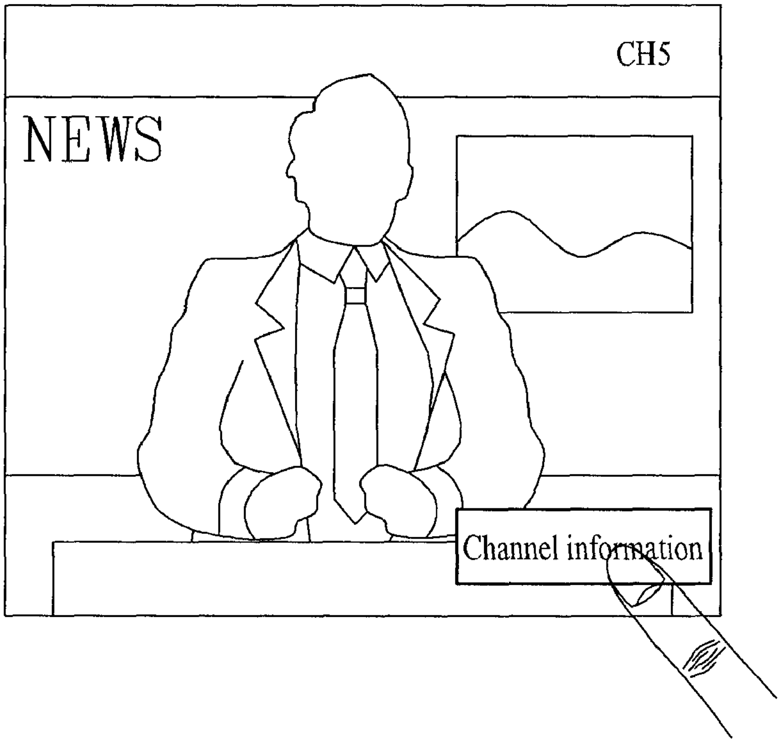
FIGS. 18 to 20B are diagrams of a screen on which channel information is displayed according to a presence or non-presence of a validity term within a broadcast time in a mobile terminal according to one embodiment of the present invention.

Referring to FIG. 17A, since a first purchase request time is 30 minutes via a first purchase image, it is announced that a purchase amount of 'News desk' is 750 Won. Referring to FIG. 17B, since a first purchase request time is 10 minutes via a first purchase image, it is announced that a purchase amount of 'News desk' is 250 Won.

Referring now to FIG. 8, the mobile terminal receives authentication information of the second broadcast use authority (hereinafter named 'second authentication information) via the wireless communication unit 100, under the control of the wireless communication unit 110 [S815]. In this case, the authentication information may refer to the information for determining whether a random broadcast content is outputtable and viewable using a currently set broadcast viewing authority.

Subsequently, the mobile terminal 100 determines whether the first broadcast content is viewable using the second authentication information received in the receiving operation S815, under the control of the controller 180 [S817]. For instance, the mobile terminal 100 determines whether the authentication information set for the first broadcast content matches the second authentication information. If the authentication information set for the first broadcast content matches the second authentication information as a result of the determination, the mobile terminal 100 is able to determine that the first broadcast content is viewable.

As a result of completion of the determining operation S817, if the first broadcast content is determined viewable, the mobile terminal 100 returns to the outputting operation S803 and is then able to keep receiving and outputting the first broadcast content. Therefore, as the second broadcast viewing authority is acquired before the expiration of the first broadcast viewing authority using the mobile terminal 100, a user is able to view the first broadcast content. Alternatively, since the second broadcast viewing authority is acquired via the first purchase image before the expiration of the first broadcast viewing authority using the mobile terminal 100, the user is able to keep viewing the first broadcast content except a period from the expiration timing point of the first broadcast viewing authority to a purchase confirmation timing point of the second broadcast viewing authority.

Meanwhile, if it is determined that the purchase of the first broadcast content is not available as a result of completion of the determining operation S807 or it is determined that the first broadcast content is not viewable as a result of completion of the determining operation S817, the mobile terminal 100 outputs the first broadcast content until the expiration timing point of the first validity term and then stops outputting the first broadcast content on the expiration of the first validity term [S819]. Subsequently, the mobile terminal 100 displays a general image for a broadcast purchase via the display unit 151 [S821].

The mobile terminal 100 according to one or more embodiments of the present invention is able to receive an input of a command signal for providing broadcast channel information based on the first validity term via the user input unit 130. For instance, the mobile terminal 100 can be provided with a separate key, or key region (if displayed on a touchscreen) for receiving the input of the providing command signal or a separate menu item. The key or key region can be physical or graphical.

In a case of receiving the providing command signal via the user input unit 130, the mobile terminal 100 is able to determine whether the first validity term expires within a broadcast time of any or a random broadcast content per broadcast channel, under the control of the controller 180. For this, the former description for the determining operation S805 is referred to.

For instance, the mobile terminal 100 is able to determine whether a first validity term expires within a broadcast time of any broadcast content for each broadcast channel. This can be achieved in a manner of searching the broadcast associated information stored in the memory 160 for broadcast time information on a broadcast content per (or for each) broadcast channel. That is, the mobile terminal 100 is able to search for each broadcast content that can or cannot be viewed using an exiting validity term, and for each channel. The mobile terminal 100 is able to display the broadcast channel information corresponding to the above determination result via the display unit 151, under the control of the controller 180.

In the following description, an embodiment of a screen configuration for displaying broadcast channel information according to expiration or non-expiration of a validity term within a broadcast time in the mobile terminal 100 is explained in detail with reference to FIGS. 18 to 20B.

First of all, the mobile terminal 100 is able to receive an input of a command signal for providing broadcast channel information based on a first validity term from a user. For instance, when the mobile terminal 100 includes a touchscreen, and if 'channel information' region (as a key or a button) provided to the touchscreen is touched by a user, the mobile terminal 100 is able to receive an input of the providing command signal.

The mobile terminal 100 determines whether a first validity term expires within a broadcast time of any or a random broadcast content per (or each) broadcast channel and is then able to display broadcast channel information according to a result of the determination on a screen [FIG. 19A to FIG. 19D]. Accordingly, any and all broadcast content for any and all broadcast channel that can be viewed using the existing broadcast viewing authority or within the existing validity term can be obtained and displayed.

To elaborate, in the following description, for convenience and clarity of explanation, assume that an expiration timing point of the first validity term is '4 o'clock' and assume that a determination timing point is '3 o'clock'. A broadcast channel, of which first validity term expires within a broadcast time of a random broadcast content, is named or referred to as an 'expiratory channel'. A broadcast channel, of which first validity term does not expire within a broadcast time of a random broadcast content, is named or referred to as a 'non-expiratory channel'.

Figure 19A:
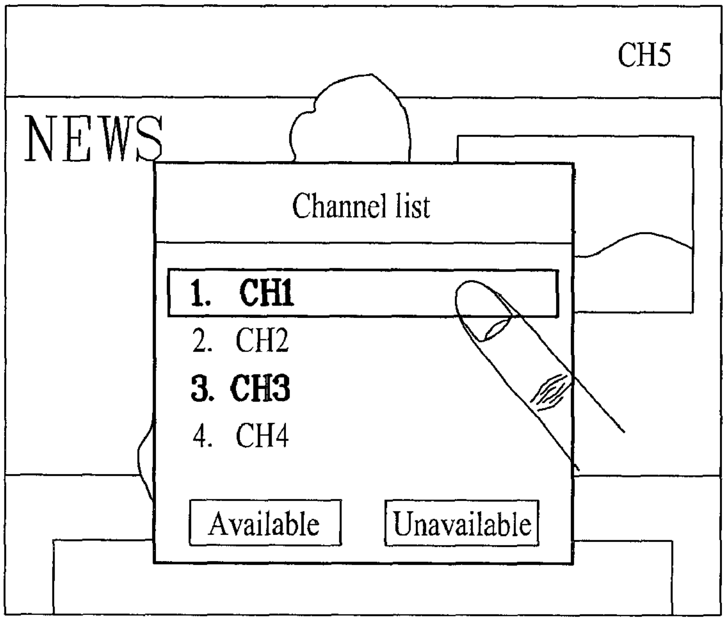

In a case of receiving an input of a providing command signal, the mobile terminal 100 is able to display a broadcast channel list, in which an expiratory channel and a non-expiratory channel are represented by being distinguished from each other [FIG. 19A], for example, by being bolded. Other distinguishing indicia, such as highlighting, using different fonts, using different size text, different color text, other others, are within the scope of the present invention.

Figure 19B:
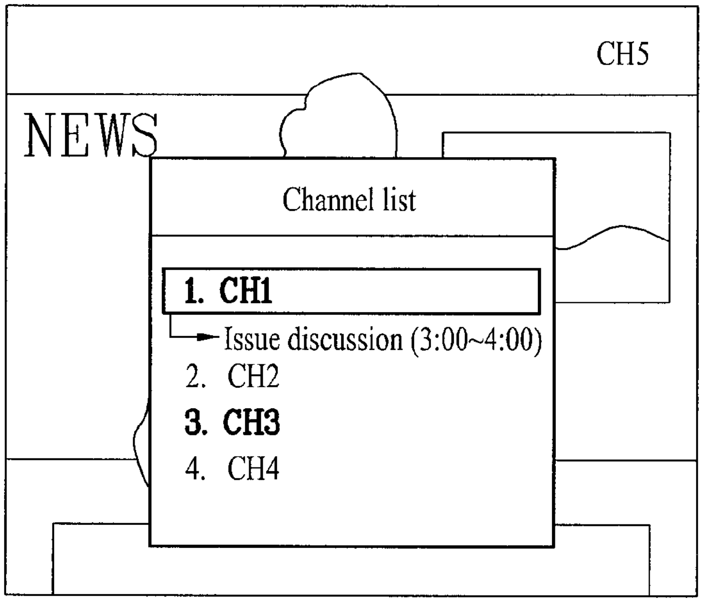

If a specific broadcast channel is selected from the broadcast channel list shown in FIG. 19A (such as CH1), the mobile terminal 100 is able to display information of a broadcast content, of which broadcast time does not expire within a first validity term (if the specific broadcast channel is a non-expiratory channel), or information of a broadcast content, of which first validity term expires within a broadcast time (if the specific broadcast channel is an expiratory channel), among the broadcast contents provided on the specific broadcast channel [FIG. 19B].

Figure 19C:
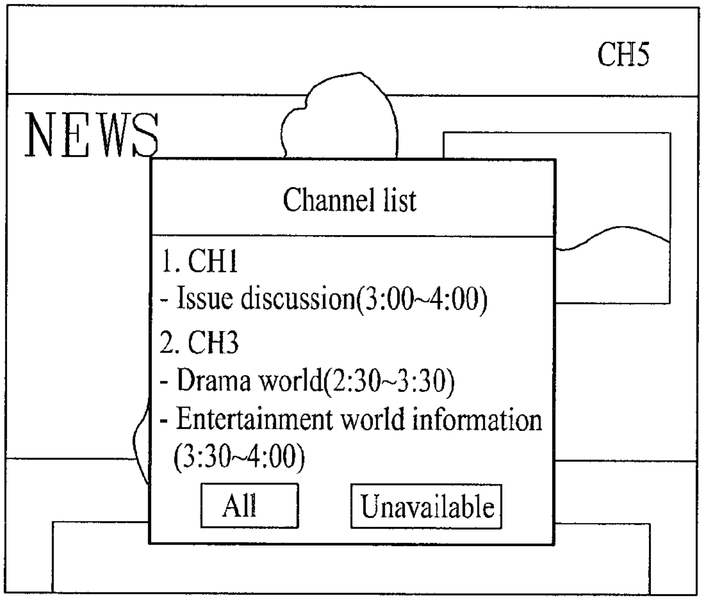

Also, instead of selecting a particular channel, as discussed above, if an 'available' region (as a key or a button) is selected in FIG. 19A, the mobile terminal 100 may simply display a broadcast channel list including the non-expiratory channels [FIG. 19C]. Also, if an 'unavailable' region (as a key or a button) is selected in FIG. 19A, the mobile terminal 100 displays a broadcast channel list including the expiratory channels [FIG. 19D].

In a case of receiving an input of a providing command signal, the mobile terminal 100 is able to display a broadcast channel list including the non-expiratory channels [FIG. 19C]. In this case, the mobile terminal 100 is able to display information on a broadcast content having a broadcast time that does not expire within a first validity term for each of the non-expiratory channels in the broadcast channel list.

Within this case, if an 'all' region (as a key or a button) is selected in FIG. 19C, the mobile terminal 100 displays a broadcast channel list having both the expiratory channels and non-expiratory channels [FIG. 19A]. If an 'unavailable' region (as a key or a button) is selected in FIG. 19C, the mobile terminal 100 displays a broadcast channel list having the expiratory channels [FIG. 19D].

Figure 19D:
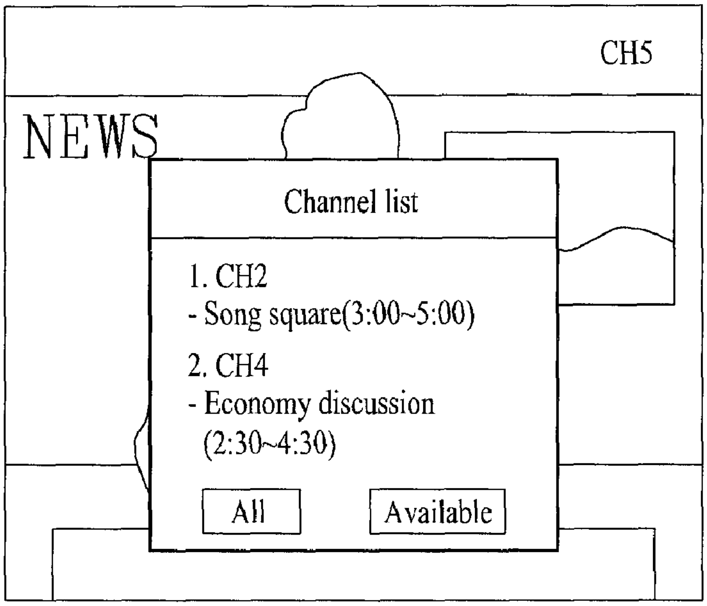

In another case of receiving an input of a providing command signal, the mobile terminal 100 is able to display a broadcast channel list including the non-expiratory channels [FIG. 19D]. In this case, the mobile terminal 100 is able to display information on a broadcast content having a broadcast time expiring within a first validity term for each of the non-expiratory channels in the broadcast channel list.

Within this case, if the 'all' region (as a key or a button) is selected in FIG. 19D, the mobile terminal 100 displays a broadcast channel list having both the expiratory channels and non-expiratory channels [FIG. 19A]. If the 'available' region (as a key or a button) is selected in FIG. 19D, the mobile terminal 100 displays a broadcast channel list having the non-expiratory channels [FIG. 19C].

Figure 20A:
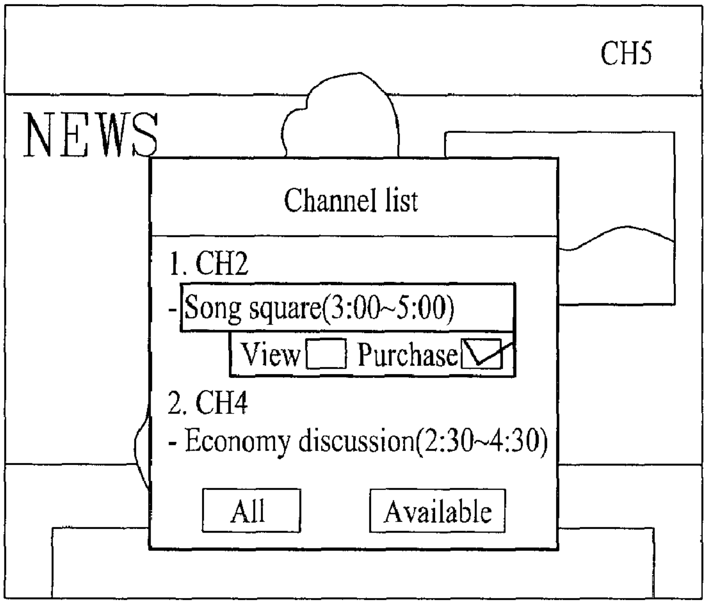
Figures 20B, 21A:
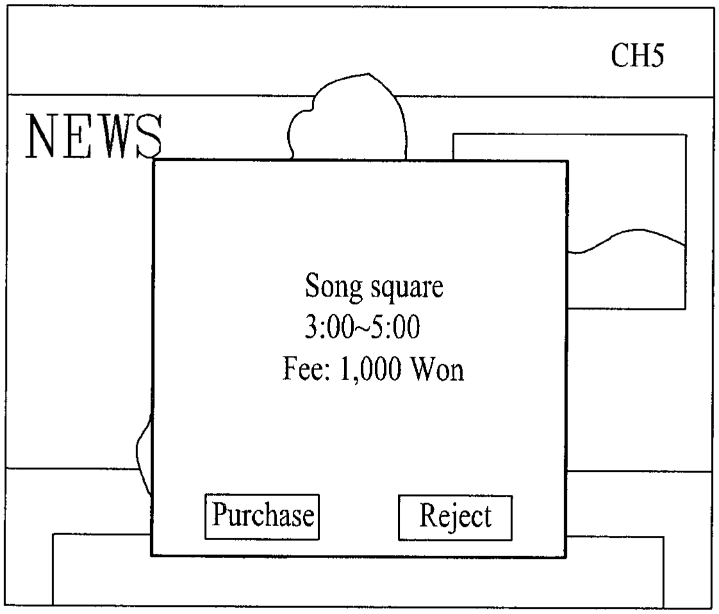
FIGS. 21A to 23D are diagrams for a screen configuration according to a result of comparison between a broadcast time and a validity term in setting a viewing/recording reservation in a mobile terminal according to one embodiment of the present invention.

Moreover, if a broadcast content of the expiratory channel is selected in FIG. 19D, the mobile terminal 100 is able to display an image for selecting a broadcast for purchase [FIG. 20A], and then, the mobile terminal 100 is able to display an image for actually purchasing the selected broadcast content [FIG. 20B].

Figure 9:
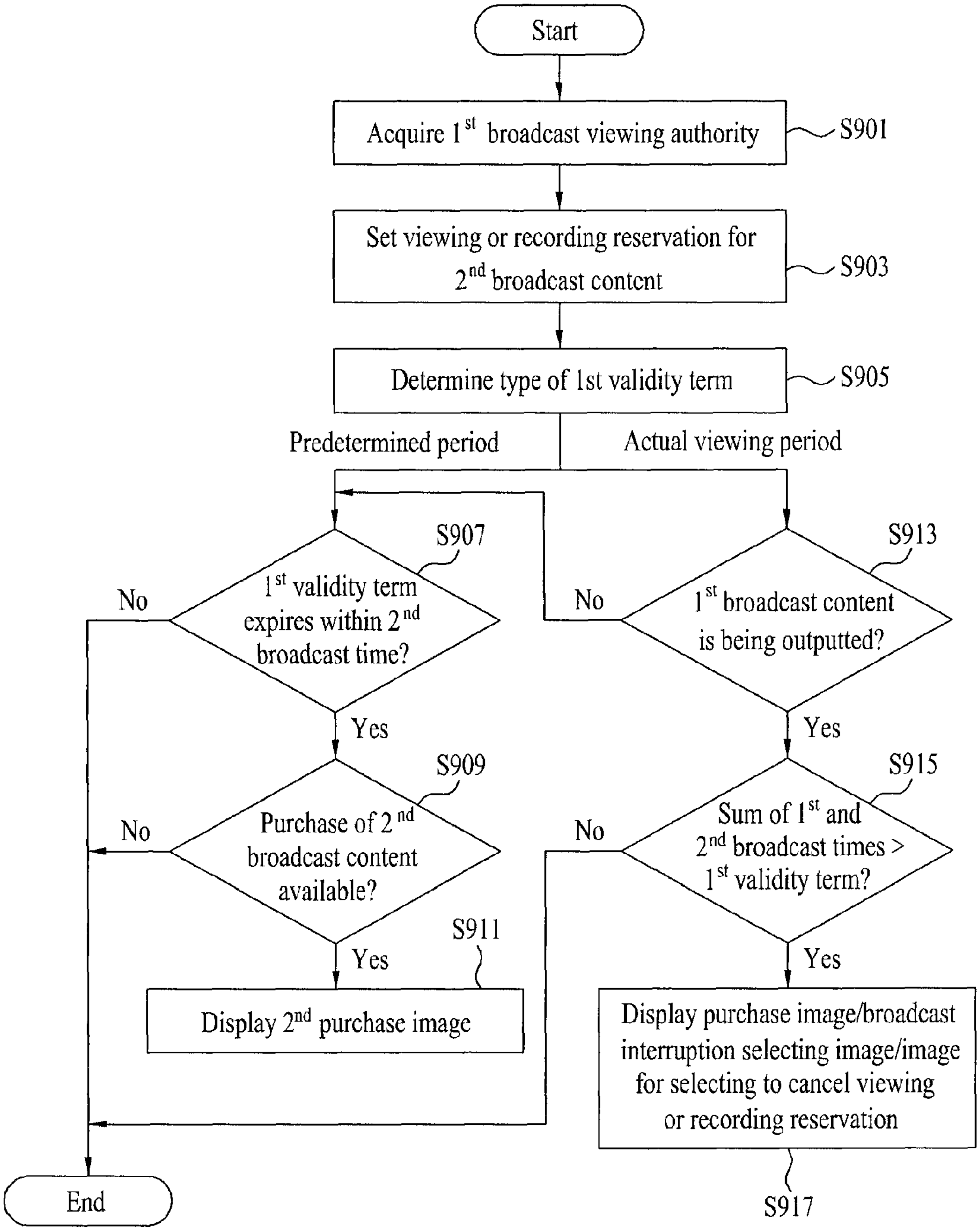
FIG. 9 is a flowchart for a method of controlling a broadcast in a mobile terminal according to another embodiment of the present invention.

FIG. 9 is a flowchart for a method of controlling a broadcast in a mobile terminal according to another embodiment of the present invention. Referring to FIG. 9, the mobile terminal 100 acquires a first broadcast viewing authority, under the control of the controller 180 [S901]. For a detailed explanation of this operation, the former acquiring operation S801 described with reference to FIG. 8 is referred to.

Subsequently, the mobile terminal 100 sets up a viewing reservation or a recording reservation for a second broadcast content according to a user selection action via the user input unit 130 [S903]. In this case, the setting operation S903 can be performed before or in the course of outputting a broadcast content.

If a menu item or a key (or, a key region in case of a touchscreen) corresponding to the viewing/recording reservation setting is selected by a user via the user input unit 130, the mobile terminal 100 is able to set up a standby mode for performing the setting operation S903.

In the setting operation S903, the mobile terminal 100 displays a broadcast channel list, a broadcast content list, a broadcast organization table and the like, selects a specific content from the displayed list or table, and is then able to make a viewing or recording reservation for the selected broadcast content.

Figure 22A:
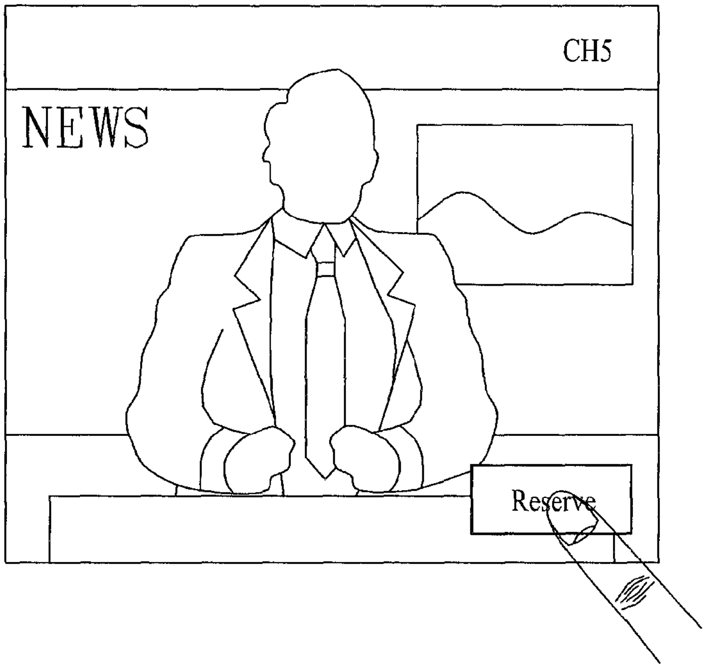
Figure 22B:
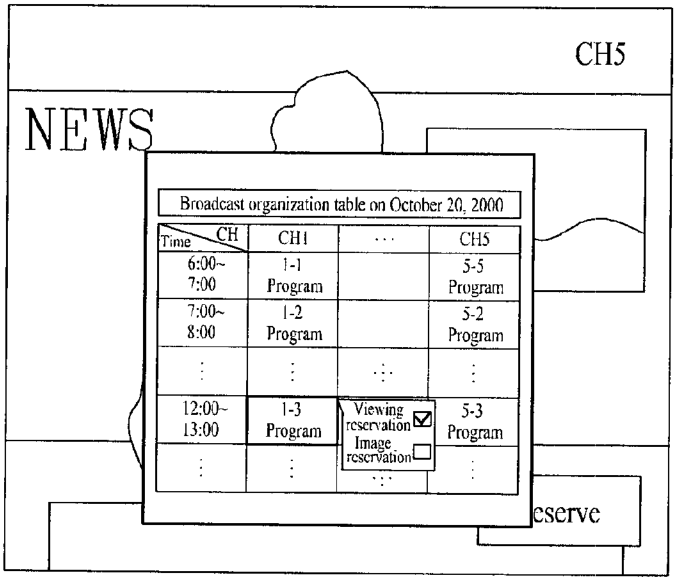

For instance, in case of receiving an input of a user action for a viewing/recording reservation setting prior to or in the course of outputting a broadcast [FIG. 22A], the mobile terminal 100 displays a broadcast organization table and is then able to receive a selection of a viewing/recording reservation for a program referred to as '1-3 program' from a user [FIG. 21A or FIG. 22B].

The mobile terminal 100 determines a type of a first validity term, under the control of the controller 180 [S905]. The first validity term may include a predetermined period having a designated start timing point and a designated expiration timing point (e.g., from 09:00 on Oct. 1, 2008 to 09:00 on Oct. 7, 2008, in 2008, for 1 day, for 1 week, etc.) or an actual viewable period (e.g., 1 hour, 10 hours, 24 hours, etc.).

First of all, in DVB-H, for example, there is such a broadcast product having a first validity term of a predetermined period as a bundle product, a pay per subscription and the like. Also, there is such a broadcast product having a first validity term of an actual viewable period as a pay per time and the like.

In the following description, a case in which a result of the determining operation S905 for a first validity term is a predetermined period is explained (i.e., the predetermined period branch subsequent to operation s905 in FIG. 9).

First of all, the mobile terminal 100 determines whether a first validity term expires within a broadcast time of a second broadcast content (hereinafter named 'second broadcast time') expires, under the control of the controller 180 [S907].

For a detailed explanation of this operation, the former determining operation S805 described with reference to FIG. 8 is referred to.

In a case of determining that the first validity term expires in the determining operation S907, the mobile terminal 100 determines a presence or non-presence of availability for a purchase of the second broadcast content, under the control of the controller 180 [S909]. For a detailed explanation of this operation, the former determining operation S807 described with reference to FIG. 8 is referred to.

In a case of determining the presence of the availability for the purchase of the second broadcast content in the determining operation S909, the mobile terminal 100 displays an image for purchasing the second broadcast content (hereinafter named 'second purchase image') [S911]. Therefore, a user is able to purchase the second broadcast content via the second purchase image and is able to make a viewing or recording reservation for the second broadcast content until an expiration timing point of the second broadcast content.

Figure 21B:
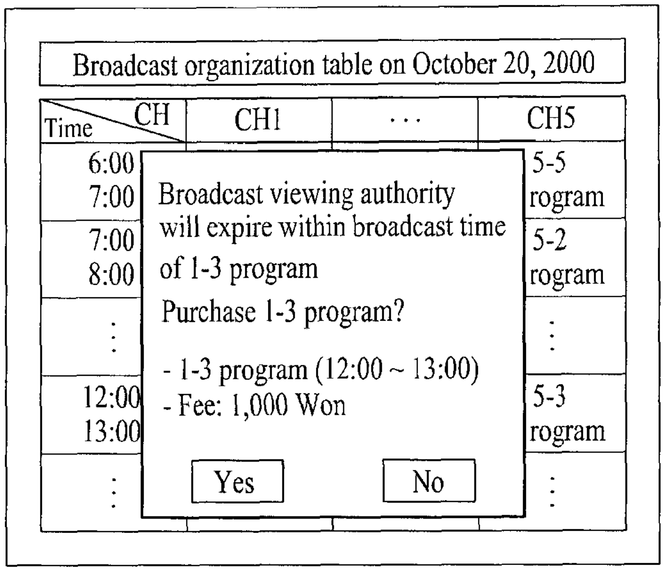

For instance, referring to FIG. 21B, the mobile terminal 100 indicates that a first validity term expires within a broadcast time of the second broadcast content (1-3 program), for which the viewing reservation is made, and is able to display the second purchase image for enabling a user to select whether to purchase the second broadcast content.

Referring back to FIG. 9, in the following description, a case in which a result of the determining operation S905 for a first validity term is an actual viewable period is explained (i.e., the actual viewing period branch subsequent to operation s905 in FIG. 9).

First of all, the mobile terminal 100 determines whether a first broadcast content is being output via the output unit 150, under the control of the controller 180 [S913].

In a case of determining that the first broadcast content is being output in the determining operation S913, the mobile terminal 100 determines whether a sum of a first remaining broadcast time and a second broadcast time exceeds the first validity term [S915].

In this case, information on the first remaining broadcast time and information on the second broadcast time are stored in the memory 160 or can be obtained from broadcast associated information received by the broadcast receiving module 111. This is explained in detail in the foregoing description and its duplicative details are omitted in the following description.

Meanwhile, in a case of determining that the first broadcast content is not being output in the determining operation S913, the mobile terminal 100 is able to perform the operations that follow the determining operation S907.

In a case of determining that the first validity term is exceeded in the determining operation S915, the mobile terminal 100 is able to display at least one of an image for purchasing at least one of a first broadcast content and a second broadcast content, an image for selecting whether to stop outputting the first broadcast content, and an image for selecting whether to cancel at least one of a viewing reservation for the second broadcast content and a recording reservation for the second broadcast content [S917]. The displaying operation S917 is explained in detail with reference to FIGS. 22A to 23D as follows.

For convenience and clarity of the following description, assume that a first broadcast content is a program referred to as 'New desk'. Also, assume that a second broadcast content is referred to as '1-3 program'.

First of all, in case of receiving a signal for a setting of a viewing/recording reservation in the course of outputting 'News desk' [FIG. 22A], the mobile terminal is able to display a broadcast organization table [FIG. 22B]. Therefore, a user is able to select a viewing reservation or a recording reservation for a specific broadcast content using the broadcast organization table shown in FIG. 22B.

In the following description, assume a case that a viewing reservation is made for '1-3 program'. First of all, if a sum of a remaining broadcast time of 'News desk' and a broadcast time of '1-3 program' exceeds a first validity term, the mobile terminal 100 announces the exceeding of the first validity term, and is able to display a window for enabling a user to select at least one of 'purchase News desk', 'purchase 1-3 program', 'stop viewing News desk' and 'cancel viewing reservation' [FIG. 22C]. Although not shown, other choices within the scope of the present invention include viewing the program to the extent the first validity term allows. That is, a choice to view the program up to a point the first validity term expires.

Figure 22C:
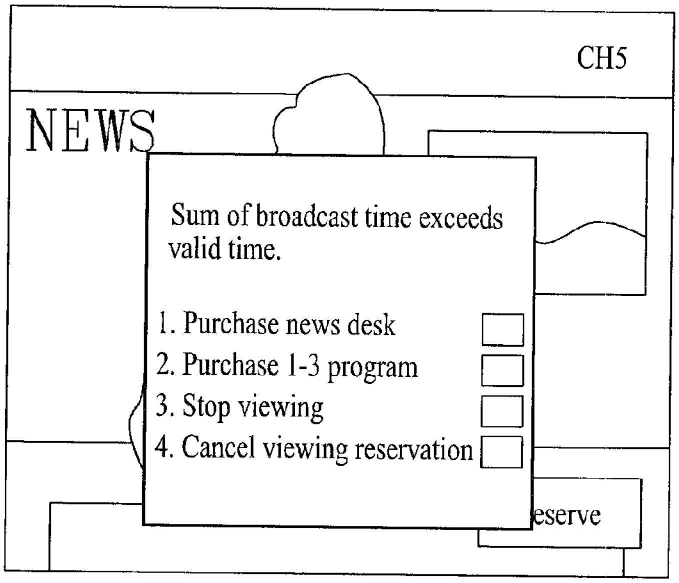
Figure 23A:
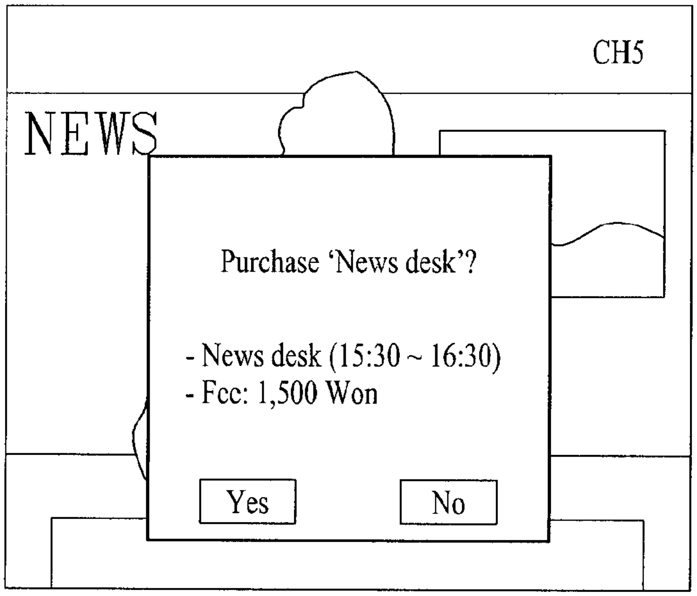
Figure 23B:
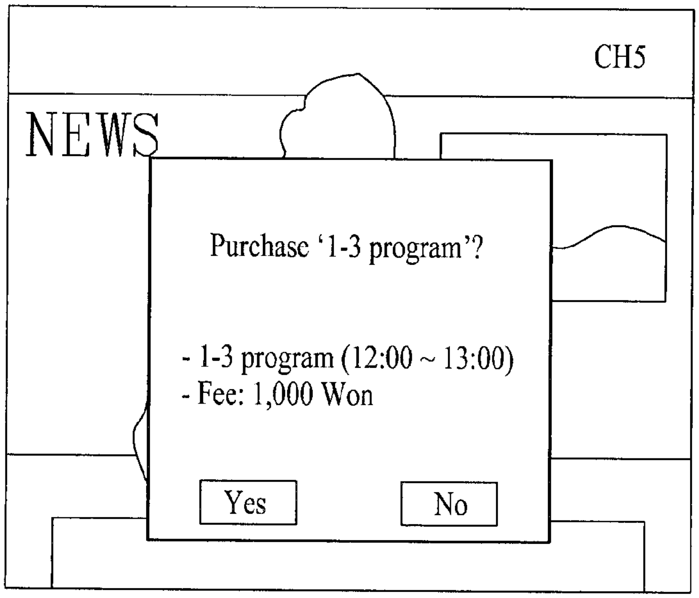

If 'purchase News desk' is selected in FIG. 22C, the mobile terminal 100 is able to display an image for purchasing 'New desk' [FIG. 23A]. If 'purchase 1-3 program' is selected in FIG. 22C, the mobile terminal 100 is able to display an image for purchasing '1-3 program' [FIG. 23B].

Figure 23C:
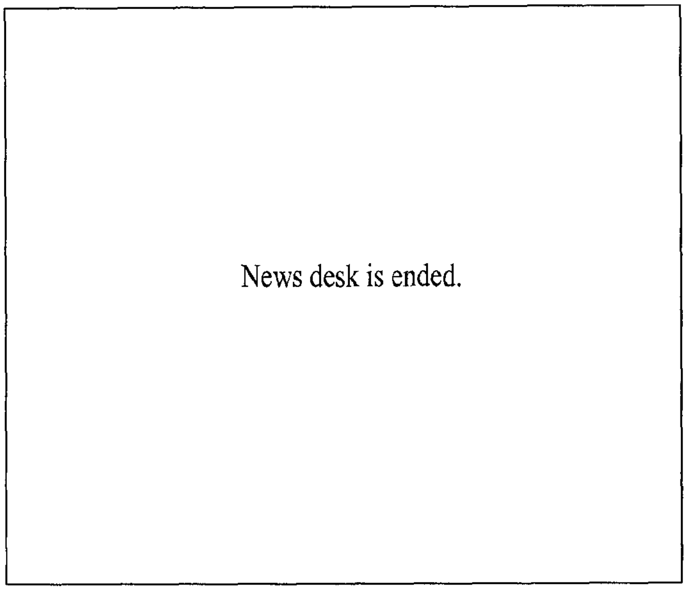
Figure 23D:
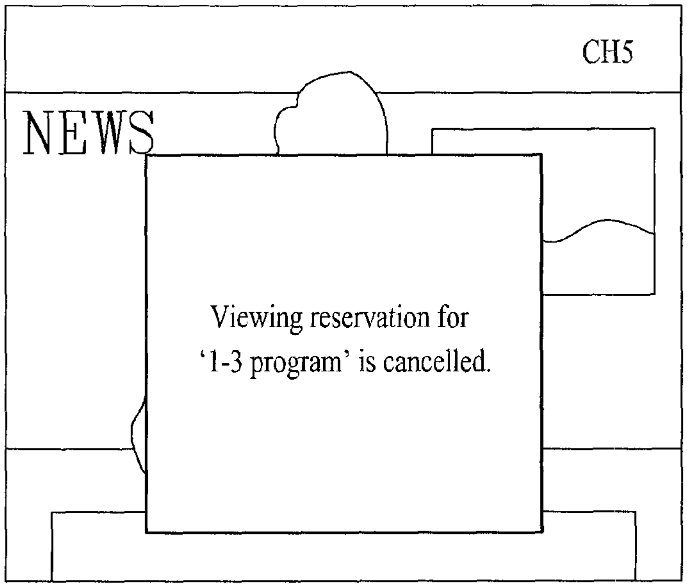

If 'stop viewing News desk' is selected in FIG. 22C, the mobile terminal 100 is able to stop outputting 'New desk' [FIG. 23C] or display a window for selecting whether to stop. If 'cancel viewing reservation' is selected in FIG. 22C, the mobile terminal 100 cancels the viewing reservation made for '1-3 program' [FIG. 23D] or displays a window for selecting whether to cancel the viewing reservation.

In one or more embodiments of the present invention, reference to a mobile terminal 100 performing a function includes a user using the mobile terminal to perform the function or the mobile terminal 100 performing the function under control or input by the user.

In one or more embodiments of the present invention, the broadcast content may be acquired, received, and/or viewed as the broadcast content is presently broadcast, or may be a later available recorded broadcast content. Reference to a broadcast time also refers to the latter case.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include transmission via Internet.

Accordingly, the one or more embodiments of the present invention provide the following effects and/or advantages, or other benefits.

First of all, if a broadcast viewing authority is determined to expire within a broadcast time, the one or more embodiments of the present invention lead a user to purchase a currently-viewed broadcast content before expiration of the broadcast viewing authority, thereby enabling the user to continue to view the corresponding broadcast content.

It will be apparent to those skilled in the art that various modifications and variations can be made in the one or more embodiments of the present invention without departing from the spirit or scope of the invention. Thus, it is intended that the one or more embodiments of the present invention cover the modifications and variations of this invention provided they come within the scope of the appended claims and their equivalents.

What is claimed is:

1. A mobile terminal comprising:

a broadcast receiving module configured to receive a first broadcast content according to an acquisition of a first broadcast viewing authority;

an output unit configured to output the first broadcast content received by the broadcast receiving module; and a controller configured to determine whether a validity term of the acquired first broadcast viewing authority expires within a broadcast time of the first broadcast content, and control the output unit to display an image for a purchase of the first broadcast content if the validity term expires within the broadcast time of the first broadcast content, wherein if the controller determines that the first broadcast content is purchased via the image for the purchase, the controller is further configured to acquire a second broadcast viewing authority for the first broadcast content, and if the second broadcast viewing authority is determined to have been acquired, the output unit is further configured to keep outputting the first broadcast content, under the control of the controller.

2. The mobile terminal of claim 1, wherein the controller is further configured to determine that the validity term expires if a remaining broadcast time of the first broadcast content is greater than a remaining validity term of the first broadcast viewing authority with reference a predetermined timing point.

3. The mobile terminal of claim 1, wherein the controller is further configured to determine that the validity term expires if a time is a time within a predetermined time from an expiration timing point of the validity term of the first broadcast viewing authority, if an output of the first broadcast content is detected, and/or if a comparison commanding signal for comparing the broadcast time with the validity term is externally input.

4. The mobile terminal of claim 1, wherein the controller is further configured to determine whether the purchase of the first broadcast content is available if the validity term is determined to expire, and if the purchase of the first broadcast content is determined to be available, the controller is further configured to control the output unit to display the image for the purchase of the first broadcast content.

5. The mobile terminal of claim 1, wherein the output unit is further configured to display the image for the purchase of the first broadcast content at at least one of a timing point within a predetermined time from an expiration timing point of the validity term of the first broadcast viewing authority, the expiration timing point of the validity term of the first broadcast viewing authority and a completion timing point of performing the determining operation, under the control of the controller.

6. The mobile terminal of claim 1, further comprising:

a wireless communication unit configured to receive authentication information of the second broadcast viewing authority, under the control of the controller, wherein the controller is further configured to determine whether the first broadcast content is viewable using the authentication information received by the wireless communication unit, and if the first broadcast content is determined to be viewable, the output unit is further configured to keep outputting the first broadcast content, under the control of the controller.

7. The mobile terminal of claim 1, further comprising:

a user input unit configured to externally receive an input of a providing command signal for broadcast channel information based on the validity term of the first broadcast viewing authority, wherein if the providing command signal is input via the user input unit, the controller determines whether the validity term expires within a broadcast time of a random broadcast content of each broadcast channel, and if the validity term is determined to expire within the broadcast time of a random broadcast content of each broadcast channel, the output unit is further configured to display the broadcast channel information corresponding to a result of the determination made by the controller, under the control of the controller.

8. The mobile terminal of claim 1, wherein if the validity term is determined to expire within the broadcast time of a random broadcast content of each broadcast channel, the controller is further configured to determine a time from an expiration timing point of the validity term of the first broadcast viewing authority to an end timing point of the first broadcast content, and a purchase amount of the first broadcast content is charged differently according to a size of the determined time.

9. The mobile terminal of claim 1, wherein if at least one of a viewing reservation for a second broadcast content and a recording reservation for the second broadcast content is made, the controller is further configured to determine whether a sum of a remaining broadcast time of the first broadcast content and a broadcast time of the second broadcast content exceeds the validity term of the first broadcast viewing authority, and if the sum is determined to exceed the validity term, the output unit is further configured to display at least one of an image for purchasing at least one of the first broadcast content and the second broadcast content, an image for selecting whether to stop outputting the first broadcast content, and an image for selecting whether to cancel at least one of the viewing reservation for the second broadcast content and the recording reservation for the second broadcast content, under the control of the controller.

10. The mobile terminal of claim 1, wherein if at least one of a viewing reservation for a second broadcast content and a recording reservation for the second broadcast content is made, the controller is further configured to determine whether the validity term of the first broadcast viewing authority expires within a broadcast time of the second broadcast content, and if the validity term is determined to expire, the output unit is further configured to display an image for a purchase of the second broadcast content, under the control of the controller.

11. The mobile terminal of claim 10, wherein the output unit is further configured to display the image for the purchase of the second broadcast content for at least one of a setting timing point of at least one of the viewing reservation and the recording reservation, and an execution timing point of the at least one of the viewing reservation and the recording reservation.

12. The mobile terminal of claim 1, further comprising:

a memory configured to store at least one of broadcast time information for each broadcast content and validity term information for each broadcast viewing authority.

13. A method of controlling a broadcast in a mobile terminal, the method comprising:

acquiring a first broadcast viewing authority;

receiving and outputting a first broadcast content if the first broadcast viewing authority is acquired;

determining whether a validity term of the acquired first broadcast viewing authority expires within a broadcast time of the output first broadcast content;

if it is determined that the validity term expires within the broadcast time, displaying an image for a purchase of the first broadcast content, purchasing the first broadcast content via the image for the purchase; and if the first broadcast content is purchased, acquiring a second broadcast viewing authority for the first broadcast content, wherein the output of the first broadcast content is maintained if the second broadcast viewing authority is acquired.

14. The method of claim 13, wherein the determining of whether the validity term expires within the broadcast time comprises determining that the validity term expires within the broadcast time if a remaining broadcast time of the first broadcast content is greater than a remaining validity term of the first broadcast viewing authority with reference to an arbitrary timing point.

15. The method of claim 14, wherein the determining of whether the validity term expires within the broadcast time is performed if a time is within a predetermined time from an expiration timing point of the validity term of the first broadcast viewing authority, if an output of the first broadcast content is detected, and/or if a comparison commanding signal for comparing the broadcast time with the validity term is externally input.

16. The method of claim 14, further comprising:

if it is determined that the validity term expires within the broadcast time according to a result of the determining of whether the validity term expires within the broadcast time, determining whether the purchase of the first broadcast content is available, wherein the displaying of the image is performed if it is determined that the purchase of the first broadcast content is available.

17. The method of claim 14, wherein the displaying of the image is performed at at least one of a timing point within a predetermined time from an expiration timing point of the validity term of the first broadcast viewing authority, the expiration timing point of the validity term of the first broadcast viewing authority and a completion timing point of performing the determining step.

18. The method of claim 14, further comprising:

externally receiving an input of a providing command signal for broadcast channel information based on the validity term of the first broadcast viewing authority;

if the providing command signal is input, determining whether the validity term expires within a broadcast time of a random broadcast content for each broadcast channel; and displaying different broadcast channel information according to whether or not the validity term expires within a broadcast time of a random broadcast content for each broadcast channel.

19. The method of claim 14, further comprising:

setting at least one of a viewing reservation for a second broadcast content and a recording reservation for the second broadcast content;

determining whether a sum of a remaining broadcast time of the first broadcast content and a broadcast time of the second broadcast content exceeds the validity term of the first broadcast viewing authority; and if the sum exceeds the validity term, displaying at least one of an image for purchasing at least one of the first broadcast content and the second broadcast content, an image for selecting whether to stop outputting the first broadcast content and an image for selecting whether to cancel at least one of the viewing reservation for the second broadcast content and the recording reservation for the second broadcast content.

20. The method of claim 14, further comprising:

setting at least one of a viewing reservation for a second broadcast content and a recording reservation for the second broadcast content;

determining whether the validity term of the first broadcast viewing authority expires within a broadcast time of the second broadcast content; and if it is determined that the validity term of the first broadcast viewing authority expires within a broadcast time of the second broadcast content, displaying an image for a purchase of the second broadcast content.

* * * * *